(12) United States Patent
Ogawa et al.

(10) Patent No.: US 11,224,110 B2
(45) Date of Patent: Jan. 11, 2022

(54) DEVICE MANAGEMENT SYSTEM AND DEVICE MANAGEMENT METHOD

(71) Applicant: Panasonic Intellectual Property Management Co., Ltd., Osaka (JP)

(72) Inventors: Takanori Ogawa, Kanagawa (JP); Toshio Horiki, Tokyo (JP); Hiroyuki Matsumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/938,748

(22) Filed: Jul. 24, 2020

(65) Prior Publication Data

US 2020/0359486 A1 Nov. 12, 2020

Related U.S. Application Data

(63) Continuation of application No. PCT/JP2019/002113, filed on Jan. 23, 2019.

(30) Foreign Application Priority Data

Jan. 26, 2018 (JP) .............................. JP2018-012049

(51) Int. Cl.
*H05B 47/155* (2020.01)
*H05B 47/165* (2020.01)
(Continued)

(52) U.S. Cl.
CPC ........... *H05B 47/175* (2020.01); *F21V 14/02* (2013.01); *G06F 3/04847* (2013.01);
(Continued)

(58) Field of Classification Search
CPC ............ G06F 3/04847; G06F 3/04886; G06F 2203/04803; G06F 3/0486; G06F 3/04817;
(Continued)

(56) References Cited

U.S. PATENT DOCUMENTS

2016/0018092 A1* 1/2016 Knaapen .................. F21V 29/70
362/235
2018/0156429 A1 6/2018 Carlet et al.

FOREIGN PATENT DOCUMENTS

JP 2008-243579 A 10/2008
JP 2008243579 A * 10/2008
(Continued)

OTHER PUBLICATIONS

International Search Report issued in corresponding International Patent Application No. PCT/JP2019/002113, dated Apr. 16, 2019, with English translation.

*Primary Examiner* — Borna Alaeddini
(74) *Attorney, Agent, or Firm* — McDermott Will & Emery LLP

(57) ABSTRACT

A device management system includes a device connection portion connectable to an electric device and a movable connection portion configured to move the electric device along a duct rail provided on a ceiling of a store. The device management system includes: a connection unit attachable to the duct rail; and a management server including a control unit configured to output control information indicating an instruction of moving the connection unit along the duct rail. The control information includes a condition of detection information detected by a position detection sensor. The management unit outputs the control information in a case in which the detection information detected by the position detection sensor satisfies the condition.

12 Claims, 21 Drawing Sheets

(51) Int. Cl.
    *F21V 14/02*     (2006.01)
    *G06F 3/0484*     (2013.01)
    *G06F 3/0488*     (2013.01)
    *H05B 47/175*     (2020.01)
    *H05B 47/125*     (2020.01)

(52) U.S. Cl.
    CPC ....... *G06F 3/04886* (2013.01); *H05B 47/125* (2020.01); *H05B 47/155* (2020.01); *H05B 47/165* (2020.01); *G06F 2203/04803* (2013.01)

(58) Field of Classification Search
    CPC ... G06F 3/0488; H05B 47/175; H05B 47/125; H05B 47/155; H05B 47/165; H05B 47/105; Y02B 20/40
    See application file for complete search history.

(56) References Cited

FOREIGN PATENT DOCUMENTS

| | | | |
|---|---|---|---|
| JP | 2017-199596 A | 11/2017 | |
| KR | 101618020 B1 | 5/2016 | |
| KR | 2018-0063517 A | 6/2018 | |
| WO | WO-2018025230 A1 * | 2/2018 | .............. F21S 8/068 |

\* cited by examiner

DEVICE MANAGEMENT SYSTEM AND DEVICE MANAGEMENT METHOD

CROSS-REFERENCE TO RELATED APPLICATIONS

This application is a continuation of PCT International Patent Application No. PCT/JP2019/002113 filed on Jan. 23, 2019, which claims the benefit of priority of Japanese Patent Application No. 2018-012049 filed on Jan. 26, 2018, the entire contents of each of which are incorporated herein by reference.

FIELD

The present disclosure relates to a device management system and a device management method for managing a movement of an electric device.

BACKGROUND

JP-A-2017-199596 discloses a lighting device such as a spotlight attached to a duct rail of a ceiling or the like. The lighting device includes a lamp body including a light emitting diode (LED) element as a light source, a plug box attached to the duct rail, a power supply circuit configured to supply lighting power to the LED element, and an arm connecting the lamp body and the plug box.

JP-A-2008-243579 discloses a power supply rail and a power supply rail device that are configured to grasp a position of a movable body attached to an electric device on a rail main body.

SUMMARY

However, in the configuration of JP-A-2017-199596, the lighting device such as the spotlight is fixed without being changed from a position of the duct rail provided on the ceiling or the like unless a person climbs up a stepladder to move the plug box manually. Therefore, for example, when a position of the lighting device is changed so as to change a layout of a space in which the lighting device is provided with respect to the duct rail, for example, to change a layout of a space in which the duct rail is provided, the person needs to climb up a stepladder to move the lighting device manually, so convenience for the user when changing the layout is not good. In particular, when a plurality of lighting devices are attached to the duct rail, it is not efficient for a person to manually move the individual lighting devices each time the layout is changed.

The present disclosure has been made in view of the above-described circumstances, and an object thereof is to provide a device management system and a device management method for controlling at least one electric device to be freely movable along a duct rail provided on a ceiling of a facility and improving convenience for a user.

The present disclosure provides a device management system. The device management system including: a movable connection device including a connection portion connectable to at least one electric device, a driving unit configured to move the electric device along a duct rail provided in a facility, and a position detection sensor, the movable connection device being attachable to the duct rail; and an information processing device including a management unit configured to output control information indicating an instruction of moving the movable connection device along the duct rail, in which the control information includes a condition of detection information detected by the position detection sensor, and in which the management unit outputs the control information in a case in which the detection information detected by the position detection sensor satisfies the condition.

The present disclosure provides a device management method. The device management method for a device management system, the device management system including a movable connection device attachable to a duct rail provided in a facility and an information processing device including a management unit, the device management method including: connecting at least one electric device; outputting, by the management unit, control information indicating an instruction of moving the movable connection device along the duct rail; and moving the electric device along the duct rail via the movable connection device based on the control information, in which the control information includes a condition of detection information detected by a position detection sensor, and in which the management unit outputs the control information in a case in which the detection information detected by the position detection sensor satisfies the condition.

According to the present disclosure, it is possible to control at least one electric device to be freely movable along a duct rail provided on a ceiling of a facility and to improve convenience for a user.

DETAILED DESCRIPTION

Hereinafter, a device management system and a device management method according to embodiments of the present invention will be described in detail with reference to the drawings. However, unnecessarily detailed descriptions may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present invention by those skilled in the art, and are not intended to limit the subject matter recited in the claims.

(Outline of Configuration of Device Management System)

Figure 1:
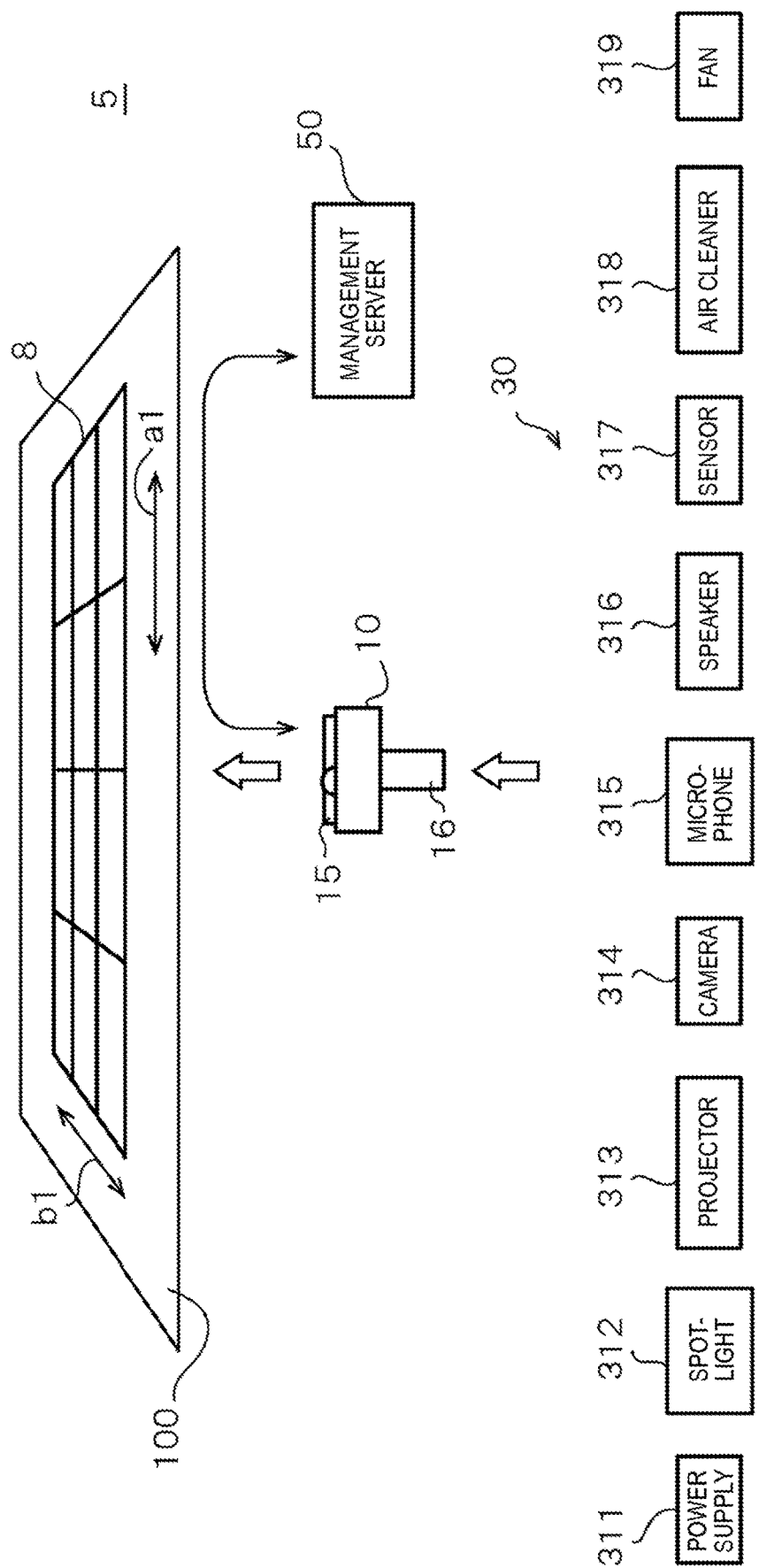
FIG. 1 illustrates a schematic example of a configuration of a device management system according to a first embodiment.

FIG. 1 illustrates a schematic example of a configuration of a device management system 5 according to a first embodiment. The device management system 5 includes a plurality of connection units 10 that are movable along a duct rail 8 laid on a ceiling 100 of a store, and a management server 50 configured to instruct a movement and operation of each of the connection units 10. In FIG. 1, only one connection unit 10 is illustrated so as to simplify the drawing. In the following first embodiment, the store is exemplified as an example of a facility in which the duct rail 8 is laid. However, a facility provided with the duct rail 8 is not limited to the store as long as the facility is provided with a ceiling, and may be an office, a factory, a convenience store, a public facility (for example, a city hall or a library), or a commercial facility such as a shopping mall in which a plurality of stores are arranged. The duct rail 8 is not limited to being laid on the ceiling, and may be laid on a side wall of the facility. That is, the duct rail 8 may be laid on an upper surface (the ceiling) or a side surface (the side wall) that defines an internal space of the facility.

The duct rail 8 is laid, for example, in a grid shape so that each of the plurality of connection units 10 can freely move in directions indicated by the arrows a1, b1 in the drawing relative to a ceiling surface of the ceiling 100 of the store. For the duct rail 8, for example, a general-purpose or existing wiring duct to which a lighting device can be attached can be used. The connection unit 10 is movably attached to the duct rail 8. The connection unit 10 is configured to connect various electric devices 30 (described below). The connection unit 10 is capable of moving the electric devices 30 connected to the connection unit 10 along the duct rail 8 in the directions indicated by the arrows a1, b1 in the drawing by moving in the directions indicated by the arrows a1, b1 in the drawing. The duct rail 8 is laid in a grid shape in FIG. 1. However, a plurality of the duct rails 8 may be laid so as not to intersect with one another. Each duct rail 8 may have various shapes such as a straight line, a curved line, and a polygonal line, and may have various shapes such as a circle, an ellipse, a square, a rectangle, and a polygon.

The various electric devices 30 connectable to the connection unit 10 are exchangeably connected to the connection unit 10. Examples of the various electric devices 30 include a power supply 311, a spotlight 312, a projector 313, a camera 314, a microphone 315, a speaker 316, a sensor 317 configured to detect a movement of a person, an air cleaner 318, and a fan 319. The sensor 317 is not limited to a sensor configured to detect a movement of a person. The various electric devices 30 are not limited to the devices limited and listed above.

The connection unit 10 to which the electric devices 30 is to be connected communicates with the management server 50 connected via the duct rail 8 (for example, wired or wireless communication), and moves to a position instructed by the management server 50. The electric devices 30 perform various types of operation (for example, pan rotation or tilt rotation, or both pan rotation and tilt rotation) according to an instruction from the management server 50 at a position after the connection unit 10 has been moved or during the movement of the connection unit 10.

(Details of Configuration of Device Management System)

Figure 2:
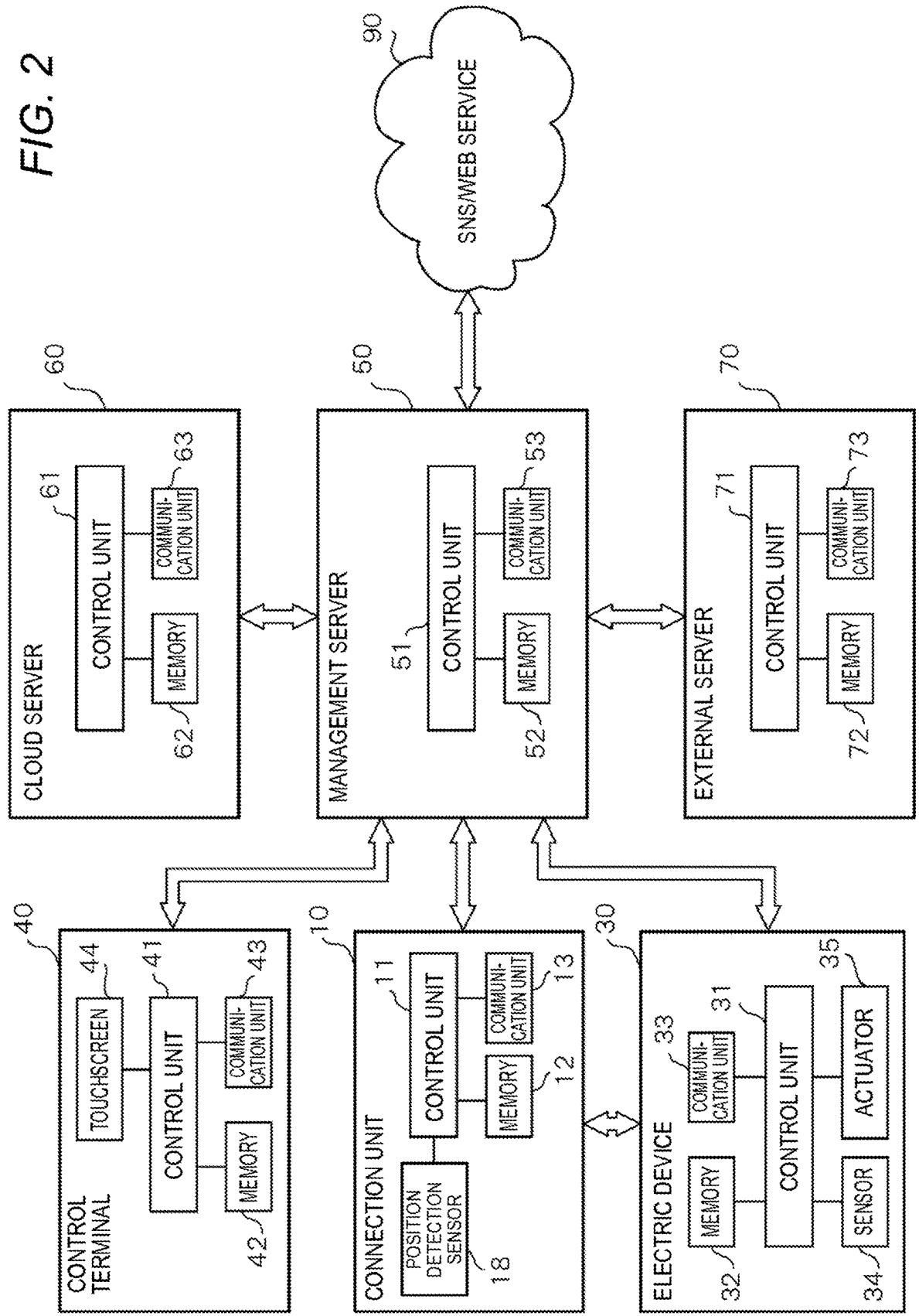
FIG. 2 is a block diagram showing a hardware configuration example of the device management system according to the first embodiment.

FIG. 2 is a block diagram showing a hardware configuration example of the device management system 5 according to the first embodiment. The device management system 5 includes the connection unit 10, the various electric devices 30, a control terminal 40, the management server 50, a cloud server 60, and an external server 70.

The connection unit 10 includes a control unit 11, a memory 12, and a communication unit 13.

The control unit 11 is a processor including, for example, a central processing unit (CPU), a micro processing unit (MPU), a digital signal processor (DSP), or a field programmable gate array (FPGA). The control unit 11 functions as a controller configured to control operation of the connection unit 10, and is configured to perform control processing for generally controlling operation of each unit of the connection unit 10, data input and output processing with each unit of the connection unit 10, data calculation processing, and data storage processing. The control unit 11 operates according to programs and data that are stored in the memory 12. The control unit 11 uses the memory 12 during operation and records data generated by the control unit 11 in the memory 12.

The memory 12 includes, for example, a random access memory (RAM) and a read only memory (ROM), and is configured to temporarily store programs and data that are necessary for executing the operation of the connection unit 10 and information, data, or the like that is generated during the operation. The RAM is, for example, a work memory used in the operation of the control unit 11. The ROM is configured to store, for example, programs and data for controlling the control unit 11 in advance. The memory 12 is also configured to store control information transmitted from the management server 50, identification information of the memory 12, and the like.

The communication unit 13 is connected to a network (not shown) using, for example, power line communication (PLC), and is capable of communicating with the management server 50 connected to the network. The communication unit 13 may have a wireless local area network (LAN) function, and in this case, may be connected to the management server 50 using a wireless LAN. When the connection unit 10 receives control information from the management server 50, the connection unit 10 stores the received control information in the memory 12, and moves to a predetermined position of the duct rail 8 based on the control information. Accordingly, the management server 50 is capable of moving the electric devices 30 connected to the connection unit 10.

A position detection sensor 18 is used to estimate and detect where the connection unit 10 is positioned on the duct rail 8. As the position detection sensor 18, for example, an acceleration sensor, a magnetic sensor, a gyro sensor, and the like may be used in combination, or any one thereof may be used alone. Alternatively, the connection unit 10 may have a WiFi (registered trademark) communication function, so that the position detection sensor 18 can perform position estimation based on beacon information from an access point (not shown) of WiFi (registered trademark), or perform position estimation based on radio wave intensity from the access point (not shown). The position detection sensor 18 may be replaced with an RFID tag, or may be replaced with, for example, a transmitter and/or a receiver of a Bluetooth (registered trademark) beacon.

The electric devices 30 includes a control unit 31, a memory 32, a communication unit 33, a sensor 34, an actuator 35, and the like.

The control unit 31 is a processor including, for example, a CPU, an MPU, a DSP, or an FPGA. The control unit 31 functions as a controller configured to control operation of the electric devices 30, and is configured to perform control processing for generally controlling operation of each unit of the electric devices 30, data input and output processing with each unit of the electric devices 30, data calculation processing, and data storage processing. The control unit 31 operates according to programs and data that are stored in the memory 32. The control unit 31 uses the memory 32 during operation and records data generated by the control unit 31 in the memory 32.

The memory 32 includes, for example, a RAM and a ROM, and is configured to temporarily store programs and data that are necessary for executing the operation of the electric devices 30 and information, data, or the like that is generated during the operation. The RAM is, for example, a work memory used in the operation of the control unit 31. The ROM is configured to store, for example, programs and data for controlling the control unit 31 in advance. The memory 32 is also configured to store control information transmitted from the management server 50, identification information of the memory 32, and the like.

The communication unit 33 is electrically and physically connected to the connection unit 10 by wire, for example, and is configured to transmit and receive data or information to and from the connection unit 10. For example, when the electric devices 30 are Internet of Things (IoT) devices, the communication unit 33 transmits detection information detected by the sensor 34, control information when the electric devices 30 are directly operated by the user or the like, event information, and the like to the management server 50 via the connection unit 10. The communication unit 33 receives control information (for example, information for controlling the electric devices 30) transmitted from the management server 50 via the connection unit 10. Communication between the communication unit 33 and a communication unit 53 of the management server 50 may be performed via the connection unit 10, or may be performed directly by wireless communication or the like without using the connection unit 10.

The electric devices 30 may be operated and controlled directly by the user without using the control terminal 40 and the management server 50. The communication unit 33 may transmit operation information and control information to the management server via the connection unit 10 or not via the connection unit 10.

For example, when the electric device 30 is the fan 319, the sensor 34 may be a temperature sensor configured to detect a room temperature so that the fan 319 operates when the sensor 34 detects an increase in room temperature. The sensor 34 may also be an infrared sensor configured to sense a person so as to illuminate an approaching person when the electric device 30 is the spotlight 312. The sensor 34 may be omitted as a configuration depending on a role and an application of the electric devices 30.

For example, when the electric device 30 is the fan 319, the actuator 35 may be a motor configured to rotate the fan. When the electric device 30 is the spotlight 312, the actuator 35 may be a power supply unit configured to light a light source which is a light emitting diode (LED), a halogen lamp, or the like. The actuator 35 may be omitted as a configuration depending on the role and the application of the electric devices 30.

The control terminal 40 is, for example, a fixed stationary terminal such as a desktop personal computer (PC) or a notebook PC, or a portable terminal such as a tablet terminal or a smartphone, which is used by a user of the device management system 5. In the first embodiment, in order to make the description easy to understand, a tablet terminal will be described as an example of the control terminal 40. The control terminal 40 includes a control unit 41, a memory 42, a communication unit 43, and a touchscreen 44.

The control unit 41 is a processor including, for example, a CPU, an MPU, a DSP, or an FPGA. The control unit 41 functions as a controller configured to control operation of the control terminal 40, and is configured to perform control processing for generally controlling operation of each unit of the control terminal 40, data input and output processing with each unit of the control terminal 40, data calculation processing, and data storage processing. The control unit 41 operates according to programs and data that are stored in the memory 42. The control unit 41 uses the memory 42 during operation and records data generated by the control unit 41 in the memory 42.

The memory 42 includes, for example, a RAM and a ROM, and is configured to temporarily store programs and data that are necessary for executing the operation of the control terminal 40 and information, data, or the like that is generated during the operation. The RAM is, for example, a work memory used in the operation of the control unit 41. The ROM is configured to store, for example, programs and data for controlling the control unit 41 in advance. The memory 42 is also configured to store identification information of the memory 42 and the like.

The communication unit 43 is connected to the management server 50 connected via, for example, a mobile communication network (not shown) so that wireless communication is possible. The communication unit 43 may have, for example, the wireless LAN function, and may be connected to the management server 50 using a wireless LAN so that wireless communication is possible.

The touchscreen 44 is configured to display, as a user interface (UI), a UI screen for creating (that is, setting) information of a layout in a store and recipe information for controlling various types of operation for the electric devices 30 and the like (described below). The touchscreen 44 is also configured to receive various types of input operation which are touching, tapping, and the like by the user of the control terminal 40.

The management server 50 includes a control unit 51, a memory 52, and a communication unit 53.

The control unit 51 is a processor including, for example, a CPU, an MPU, a DSP, or an FPGA. The control unit 51 functions as a controller configured to control operation of the management server 50, and is configured to perform control processing for generally controlling operation of each unit of the management server 50, data input and output processing with each unit of the management server 50, data calculation processing, and data storage processing. The control unit 51 operates according to programs and data that are stored in the memory 52. The control unit 51 uses the memory 52 during operation and records data generated by the control unit 51 in the memory 52. The control unit 51 receives, generates, and manages control information including layout information and recipe information (described below), for example.

The memory 52 includes, for example, a RAM and a ROM, and is configured to temporarily store programs and data that are necessary for executing the operation of the management server 50 and information, data, or the like that is generated during the operation. The RAM is, for example, a work memory used in the operation of the control unit 51. The ROM is configured to store, for example, programs and data for controlling the control unit 51 in advance. The memory 52 is also configured to store detection information transmitted from the electric devices 30, control information for controlling the operation of the electric devices 30, control information for transmission to the connection unit 10, identification information of the memory 52, control information for disasters and emergencies, layout information, recipe information, and the like.

The communication unit 53 is connected to a mobile communication network (not shown) and the network (not shown) using a wireless LAN or the Internet. The communication unit 53 is communicably connected to the control terminal 40 connected to the mobile communication network (not shown), the cloud server 60 connected to the network (not shown), the external server 70, and the SNS/Web service 90. The communication unit 53 is communicably connected to the connection unit 10 via a PLC communication network or a wireless LAN network.

The management server 50 receives the detection information detected by the electric devices 30 from the electric devices 30 connected to the connection unit 10 via the communication unit 53. The management server 50 requests the cloud server 60 to execute analysis of the detection information via the communication unit 53, and receives a analysis result. The management server 50 receives layout information and recipe information published in the external server 70 from the external server 70 via the communication unit 53. The management server 50 transmits the layout information and the recipe information to the external server 70 so as to publish the layout information or the recipe information. The management server 50 is capable of operating in cooperation with the SNS/Web service 90. The SNS/Web service 90 includes, for example, various social networking services (SNS) and various Web services. Examples of known services of the SNS/Web service 90 include, for example, Twitter (registered trademark), Facebook (registered trademark), Instagram (registered trademark), IFTTT (Ift), and Translation.

The cloud server 60 includes a control unit 61, a memory 62, and a communication unit 63.

The control unit 61 is a processor including, for example, a CPU, an MPU, a DSP, or an FPGA. The control unit 61 functions as a controller configured to control operation of the cloud server 60, and is configured to perform control processing for generally controlling operation of each unit of the cloud server 60, data input and output processing with each unit of the cloud server 60, data calculation processing, and data storage processing. The control unit 61 operates according to programs and data that are stored in the memory 62. The control unit 61 uses the memory 62 during operation and records data generated by the control unit 61 in the memory 62. For example, data collected by the sensor 34 of the electric devices 30 may be analyzed, preferences of the user may be analyzed based on input information of the user input to the control terminal 40, or a business style and a lifestyle of the user may be analyzed in combination with data (for example, information about the lifestyle of the user, information about the preferences of the user, and information about the environment such as weather, a season, and time).

The memory 62 includes, for example, a RAM and a ROM, and is configured to temporarily store programs and data that are necessary for executing the operation of the cloud server 60 and information, data, or the like that is generated during the operation. The RAM is, for example, a work memory used in the operation of the control unit 61. The ROM is configured to store, for example, programs and data for controlling the control unit 61 in advance. The memory 62 is also configured to store detection information received from a number of servers including the management server 50.

The communication unit 63 is connected to the network (not shown) by wire or wirelessly, and communicates with the management server 50 connected to the network. The cloud server 60 analyzes the detection information received from the management server 50, and returns an analysis result to the management server 50 via the communication unit 63.

The external server 70 includes a control unit 71, a memory 72, and a communication unit 73.

The control unit 71 is a processor including, for example, a CPU, an MPU, a DSP, or an FPGA. The control unit 71 functions as a controller configured to control operation of the external server 70, and is configured to perform control processing for generally controlling operation of each unit of the external server 70, data input and output processing with each unit of the external server 70, data calculation processing, and data storage processing. The control unit 71 operates according to programs and data that are stored in the memory 72. The control unit 71 uses the memory 72 during operation and records data generated by the control unit 71 in the memory 72.

The memory 72 includes, for example, a RAM and a ROM, and is configured to temporarily store programs and data that are necessary for executing the operation of the external server 70 and information, data, or the like that is generated during the operation. The RAM is, for example, a work memory used in the operation of the control unit 71. The ROM is configured to store, for example, programs and data for controlling the control unit 71 in advance. The memory 72 is also configured to register published layout information and recipe information.

The communication unit 73 is connected to the network (not shown) by wire or wirelessly. The communication unit 73 is configured to transmit the layout information and the recipe information registered in the memory 72 to the management server 50 connected to the network (not shown). The communication unit 73 is also configured to receive the public layout information and recipe information that are transmitted from the management server 50. The external server 70 has a function of the control terminal 40, and may create layout information and recipe information and the like instead of the control terminal 40.

Figure 3:
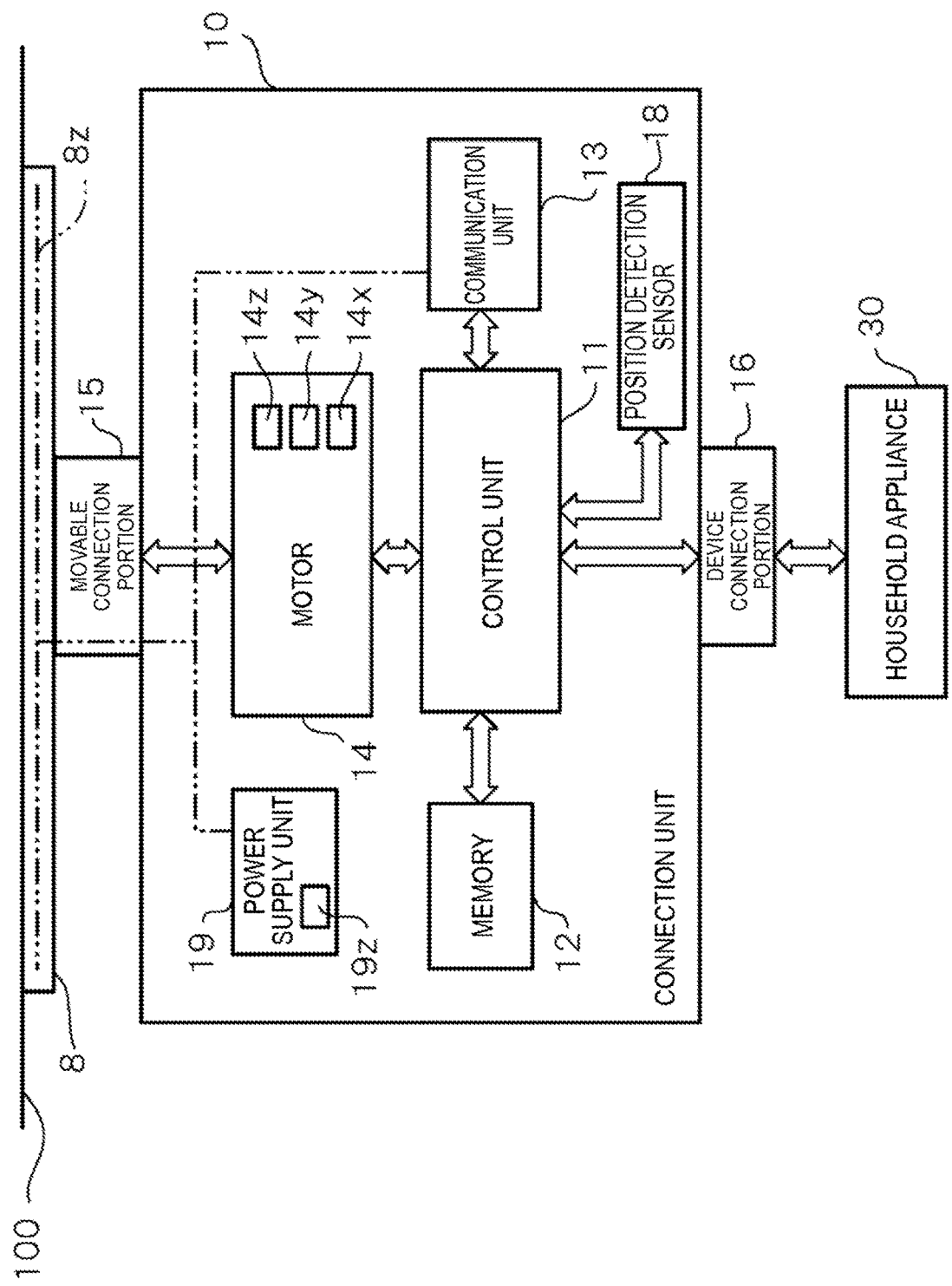
FIG. 3 is a block diagram schematically showing a configuration example of a drive system and a control system of a connection unit.

FIG. 3 is a block diagram schematically showing a configuration example of a drive system and a control system of the connection unit 10. The connection unit 10 includes a drive system and a control system. The drive system includes a movable connection portion 15, a device connection portion 16, a motor 14, and a power supply unit 19. The control system includes the control unit 11, the memory 12, and the communication unit 13. The configurations and the operation of the control unit 11, the memory 12, and the communication unit 13 provided in the control system have been described with reference to FIG. 2, so the description thereof is omitted here.

The movable connection portion 15 is configured to movably attach the connection unit 10 to the duct rail 8 (that is, connect the connection unit 10 to the duct rail 8). The connection unit 10 is movable along the duct rail 8 attached by the movable connection portion 15. A mechanism of the movable connection portion 15 will be described below in detail.

The device connection portion 16 is configured to connect the electric device 30 to the connection unit 10 (that is, connect with the electric device 30). The electric device 30 connected to the device connection portion 16 is movable along the duct rail 8 together with the connection unit 10. A mechanism of the device connection portion 16 will be described below in detail.

The motor 14 includes, for example, a moving motor 14$z$, a pan motor 14$y$, and a tilt motor 14$x$. The moving motor 14$z$ is provided in the movable connection portion 15 (see FIG. 4). The moving motor 14$z$ includes a rotation shaft on which a pinion gear 141 is rotatably supported, and is configured to cause a rack 8$y$ laid inside the duct rail 8 and the pinion gear 141 to mesh with each other to move the movable connection portion 15 in a straight line. By rotation of the moving motor 14$z$, the connection unit 10 moves along the duct rail 8.

Figure 4:
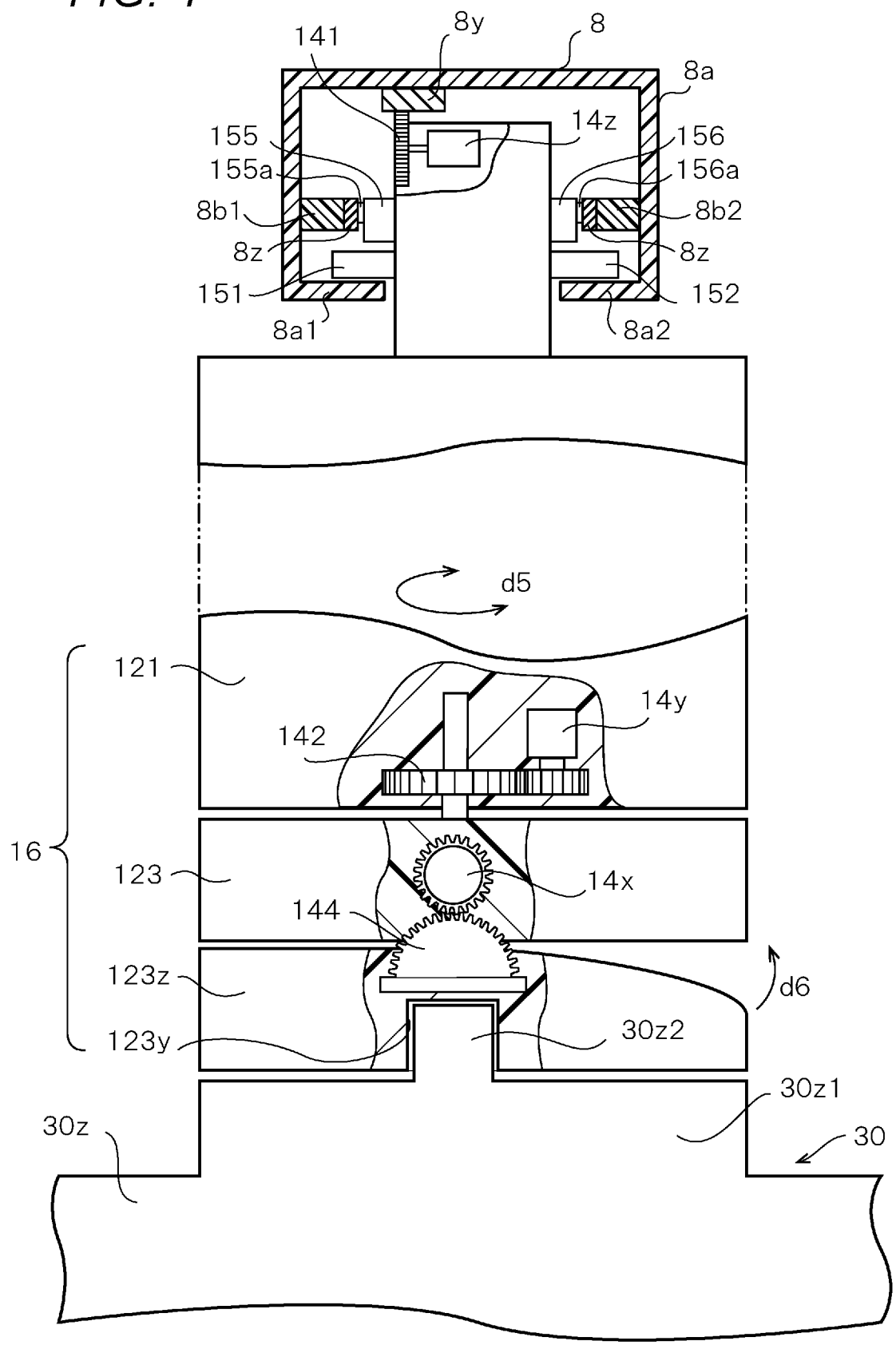
FIG. 4 is a cross-sectional view illustrating an example of a mechanism configured to connect a movable connection portion to a duct rail and an example of a mechanism configured to connect an electric device to a device connection portion.

The pan motor 14$y$ is provided in the device connection portion 16 (see FIG. 4). The pan motor 14$y$ includes a rotation shaft configured to rotate the connection unit 10 about a vertical shaft (in other words, in a vertical direction corresponding to an upper-lower direction of FIG. 3) via a gear 142 (see FIG. 4), and is configured to rotate the electric device 30 connected to the device connection portion 16 in a pan direction (that is, perform pan rotation).

The tilt motor 14$x$ is provided in the device connection portion 16 (see FIG. 4). The tilt motor 14$x$ is configured to tilt (that is, tilt and rotate) the electric device 30 in a tilt direction relative to a vertical shaft (see the above description) of the connection unit 10 via a gear 144 (see FIG. 4).

The power supply unit 19 is configured to receive a commercial alternating current from a rail-shaped electrode plate 8$z$ (see FIG. 4) which is an electrode in the duct rail 8, and to apply a DC voltage to each unit of the connection unit 10. The power supply unit 19 includes a battery 19$z$ capable of supplying power to each unit of the connection unit 10 even in an emergency or the like when power is not supplied to the electrode plate 8$z$. The battery 19$z$ is charged by the power supply unit 19.

FIG. 4 is a cross-sectional view illustrating an example of a mechanism configured to connect the movable connection portion 15 to the duct rail 8 and an example of a mechanism configured to connect the electric device 30 to the device connection portion 16. The connecting mechanism illustrated in FIG. 4 is merely an example, and various connecting mechanisms may be used.

The duct rail 8 includes an elongated housing 8$a$ having a substantially U-shaped cross section. A pair of facing locking portions 8$a$1, 8$a$2 are formed on a lower side of the duct rail 8 so as to house the movable connection portion 15 inside. On inner wall surfaces on both sides of the housing 8$a$, protrusions 8$b$1, 8$b$2 on which the electrode plates 8$z$ are provided are formed in a longitudinal direction of the housing 8$a$. A commercial alternating current flows through the electrode plates 8$z$. The rack 8$y$ that meshes with the pinion gear 141 of the moving motor 14$z$ is provided on a ceiling surface inside the housing 8$a$ in the longitudinal direction of the housing 8$a$.

The movable connection portion 15 is formed in a convex shape above the connection unit 10. On both outer side surfaces of the movable connection portion 15, the locking portions 8$a$1, 8$a$2 that are formed on the lower side of the duct rail 8 and protrusions 151, 152 that are slidable in a longitudinal direction of the duct rail 8 are formed. The pinion gear 141 of the moving motor 14$z$ protruding from an upper surface of the movable connection portion 15 meshes with the rack 8$y$. On both outer side surfaces of the movable connection portion 15, convex portions 155, 156 including contact points 155$a$, 156$a$ at distal ends of the convex portions 155, 156 are formed. The contact points 155$a$, 156$a$ are brought into contact with the electrode plates 8$z$ provided on the inner wall surfaces of both sides of the duct rail 8, respectively, and are supplied with power from the electrode plates 8$z$.

The device connection portion 16 is provided below the connection unit 10, and is configured to connect the electric device 30 to a lower surface of the connection unit 10. The device connection portion 16 is divided into an upper pan member 121 and a lower tilt member 123. The pan member 121 includes the pan motor 14$y$ and the gear 142. The tilt member 123 includes the tilt motor 14$x$ and the gear 144. The tilt member 123 includes an attachment portion 123$z$ that is tiltable in the tilt direction.

A recess 123$y$ to which the electric device 30 is to be mounted is formed on the lower surface of the attachment portion 123$z$. A housing 30$z$ of the electric device 30 includes a protrusion 30$z$1 formed with a convex portion 30$z$2 to be fitted in the recess 123$y$ of the attachment portion 123$z$. For example, the convex portion 30$z$2 of the protrusion 30$z$1 is inserted into the recess 123$y$ of the attachment portion 123$z$, and the convex portion 30$z$2 is twisted relative to the recess 123$y$ by 90°, so that a mechanical lock mechanism is applied to prevent the convex portion 30$z$2 from being detached from the recess 123$y$. The protrusion 30z1 is coupled to the attachment portion 123z. On the other hand, when the convex portion 30z2 is twisted by −90° relative to the recess 123y, the mechanical lock mechanism is released, and the convex portion 30z2 is detached from the recess 123y. The protrusion 30z1 is released from the attachment portion 123z. The attachment portion 123z and the protrusion 30z1 may be coupled with a magnetic force of a permanent magnet or an electromagnet instead of the mechanical lock mechanism. For example, an electromagnet that can be energized is attached to the recess 123y of the attachment portion 123z, and a magnet or a magnetic body is attached to the convex portion 30z2 of the protrusion 30z1. When the recess 123y of the attachment portion 123z is fitted to the convex portion 30z2 of the attachment portion 123z, the attachment portion 123z and the protrusion 30z1 are firmly coupled to each other with a magnetic force by energizing the electromagnet. On the other hand, the protrusion 30z1 is released from the attachment portion 123z by stopping the energization.

When the pan motor 14y rotates, the tilt member 123 and the electric device 30 attached to the attachment portion 123z of the tilt member 123 rotate by a predetermined angle (for example, 360°) in a pan direction d5. When the tilt motor 14x rotates, the attachment portion 123z of the tilt member 123 and the electric device 30 attached to the attachment portion 123z are tilted by a predetermined angle (for example, 30° with respect to the vertical shaft) in a tilt direction d6.

Figure 5:
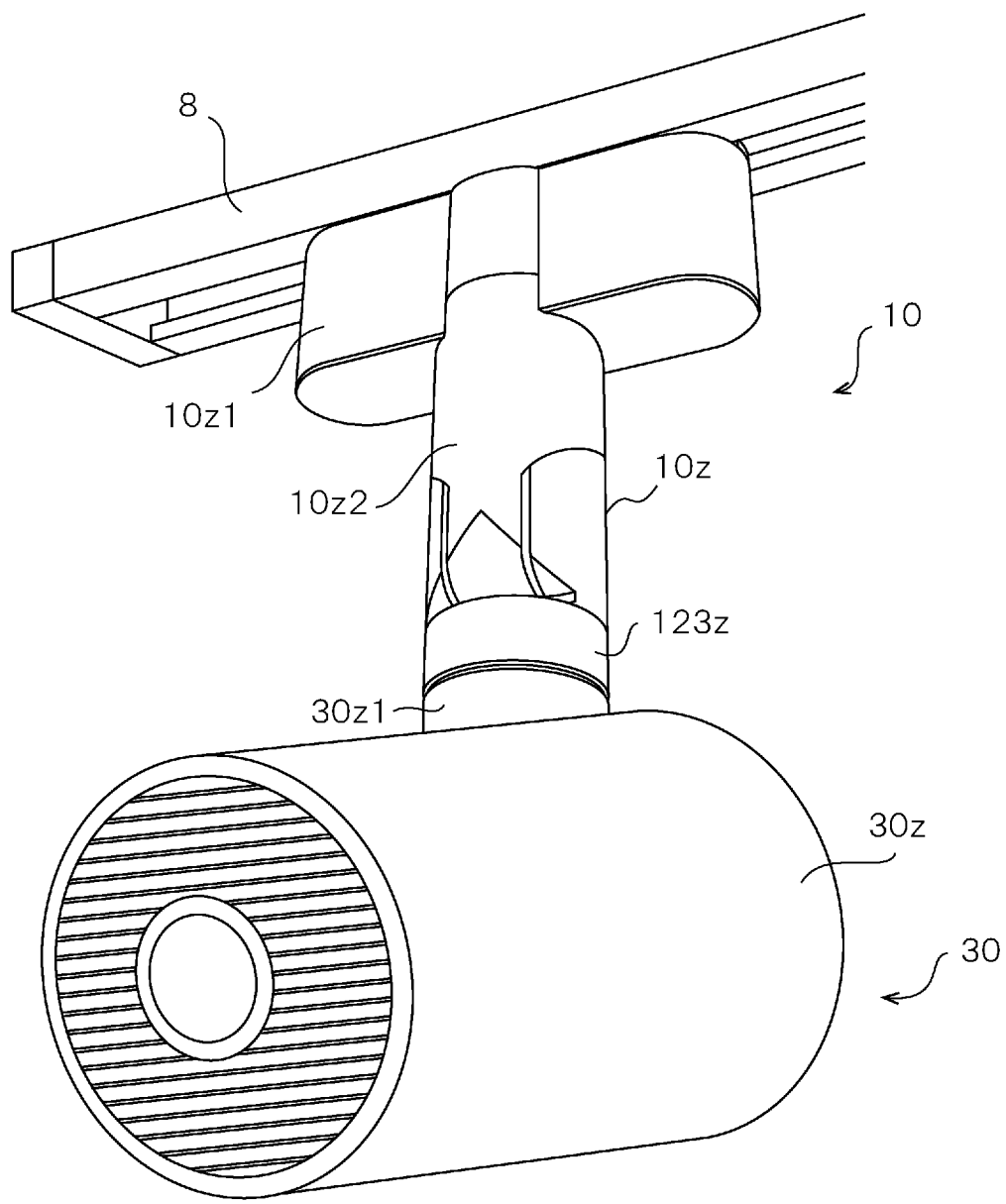
FIG. 5 is a perspective view illustrating an appearance of the connection unit in use.
Figure 6:
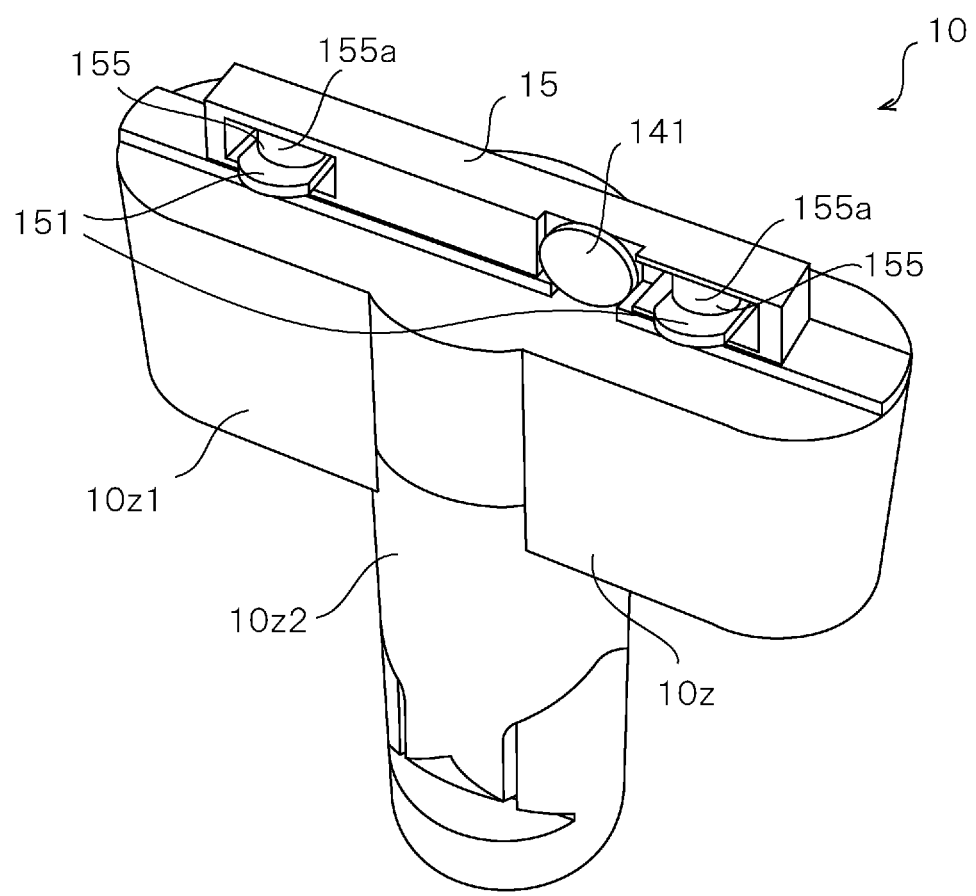
FIG. 6 is a perspective view illustrating the appearance of the connection unit as viewed obliquely from above.
Figure 7:
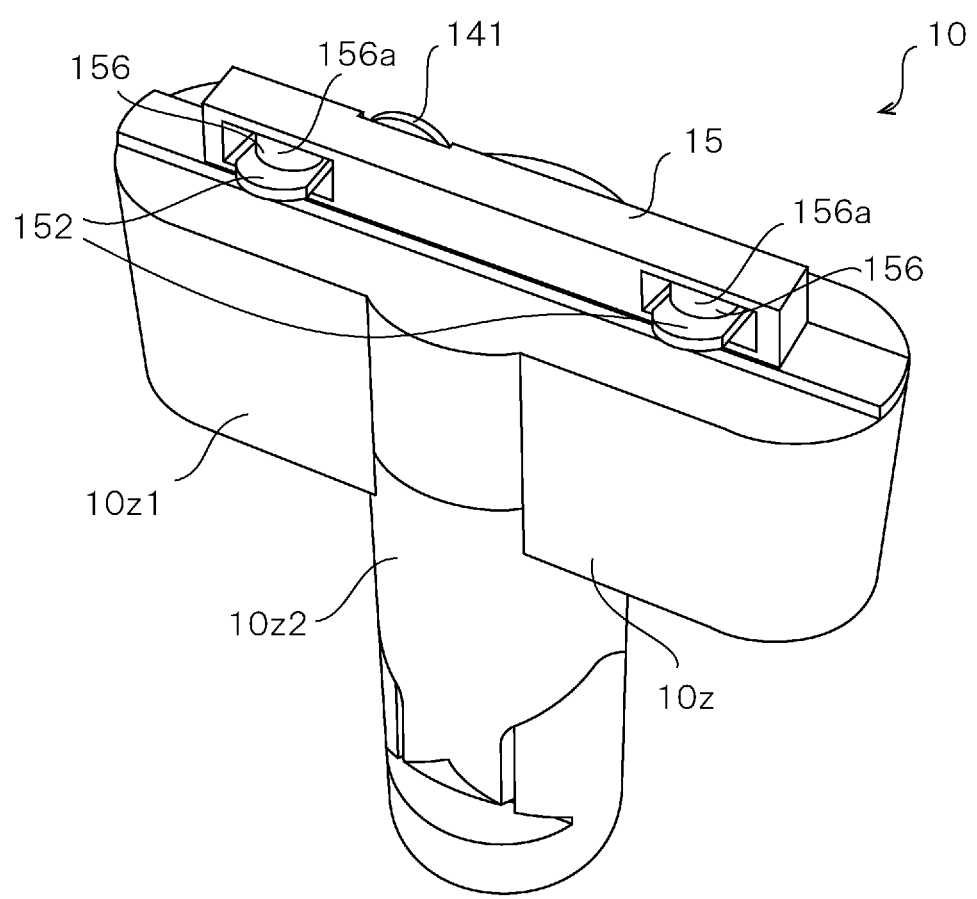
FIG. 7 is a perspective view illustrating the appearance of the connection unit as viewed from a back side of FIG. 6.
Figure 8:
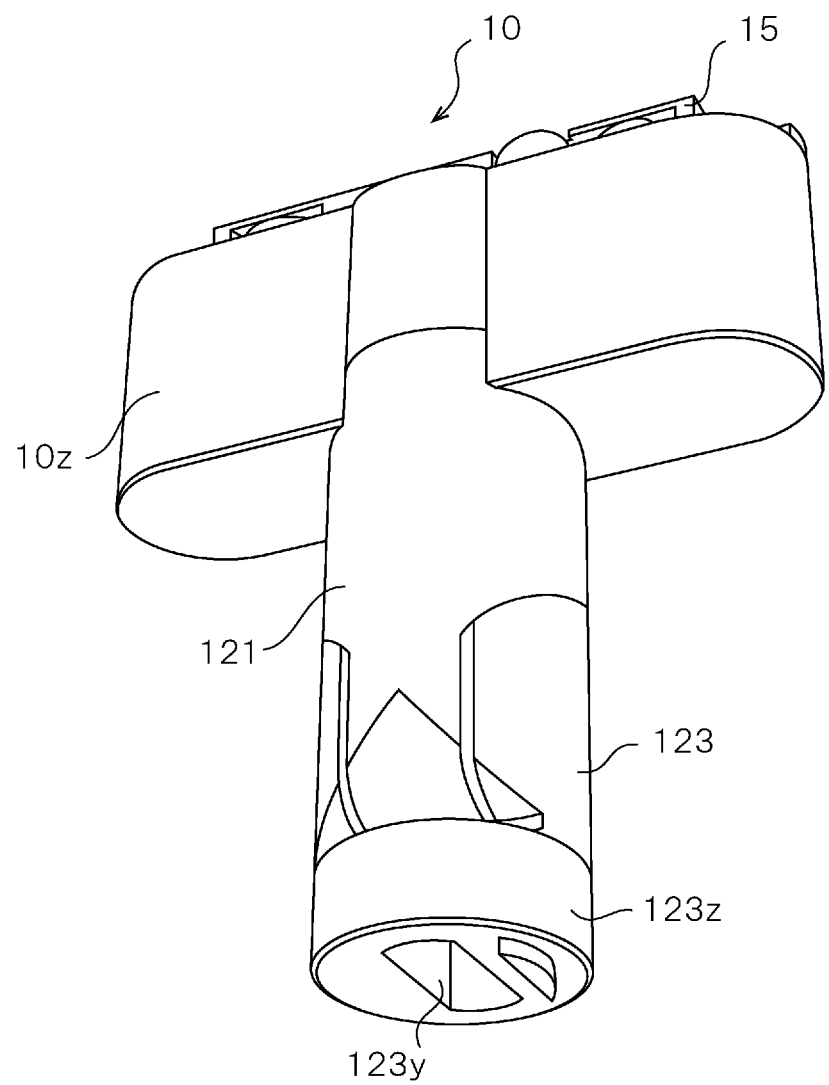
FIG. 8 is a perspective view illustrating the appearance of the connection unit as viewed obliquely from below.
Figure 9:
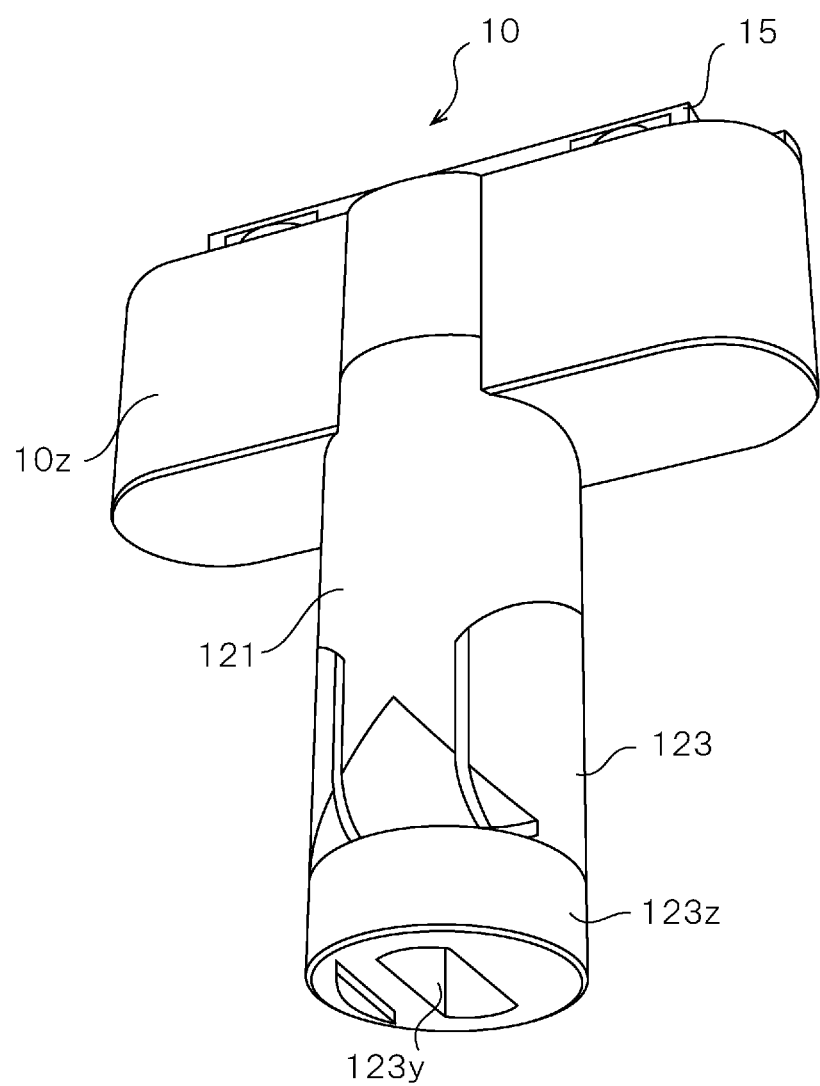
FIG. 9 is a perspective view illustrating the appearance of the connection unit as viewed from a back side of FIG. 8.

FIG. 5 is a perspective view illustrating an appearance of the connection unit 10 in use. FIG. 6 is a perspective view illustrating the appearance of the connection unit 10 as viewed obliquely from above. FIG. 7 is a perspective view illustrating the appearance of the connection unit 10 as viewed from a back side of FIG. 6. FIG. 8 is a perspective view illustrating the appearance of the connection unit 10 as viewed obliquely from below. FIG. 9 is a perspective view illustrating the appearance of the connection unit 10 as viewed from a back side of FIG. 8.

The connection unit 10 includes a substantially T-shaped housing 10z including a horizontal member 10z1 extending in a direction along the duct rail 8 and a vertical member 10z2 extending in a direction perpendicular to the duct rail 8. The connection unit 10 is movable along the duct rail 8 since the movable connection portion 15 is connected to the duct rail 8. The connection unit 10 holds the electric device 30 since the device connection portion 16 is connected to the electric device 30. In FIG. 5, for example, the projector 313 (see FIG. 1) is connected to the connection unit 10 as the electric device 30.

Figure 10:
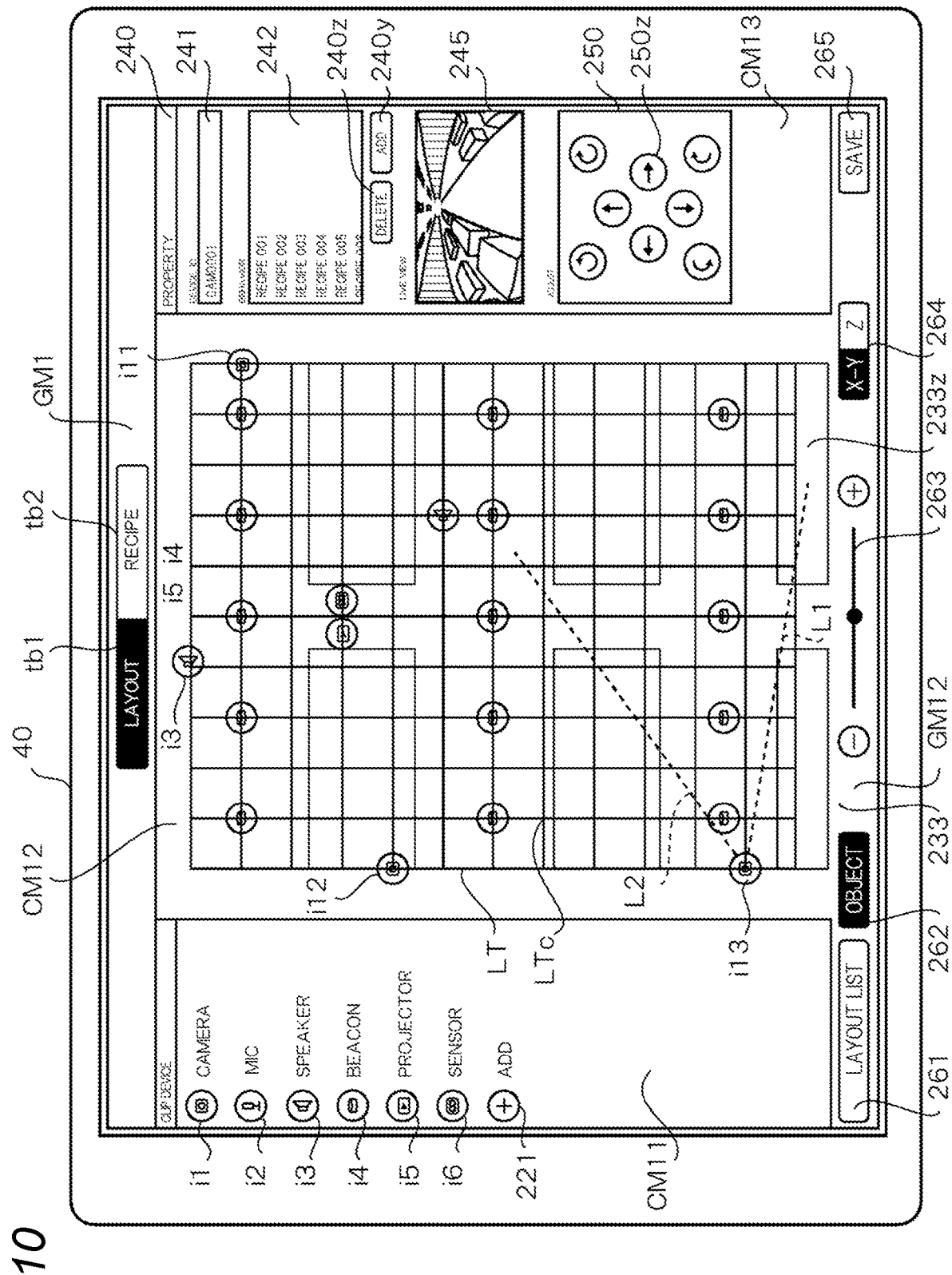
FIG. 10 illustrates an example of a screen displayed on a touchscreen of a control terminal in a case in which a tab configured to create layout information has been selected by touch operation.

FIG. 10 illustrates an example of a screen displayed on the touchscreen 44 of the control terminal 40 in a case in which a tab tb1 configured to create layout information has been selected by touch operation. By operation of the user on the screen illustrated in FIG. 10, the control unit 41 of the control terminal 40 executes processing in response to the operation, and displays data or information on an execution result on the touchscreen 44. The screen of the touchscreen 44 of the control terminal 40 is switchable between a layout screen GM1 for creating layout information and a recipe screen GM2 for setting recipe information since the user selects one of tabs tb1, tb2 arranged at an upper part of the screen.

When the tab tb1 is selected by the touch operation, the touchscreen 44 displays the layout screen GM1. The layout screen GM1 includes three columns. In the layout screen GM1, an electric device list 220 is displayed in a left column CM11 in the drawing. A layout generation screen is displayed in a central column CM12. In a right column CM13, a property 240 (PROPERTY), a live view 245 (LIVE VIEW), and an adjustment box 250 (ADJUST) are displayed.

In the electric device list 220 displayed in the column CM11, a plurality of icons representing a plurality of types of electric devices 30 are arranged vertically (that is, in an upper-lower direction of FIG. 10). Here, as the plurality of icons, for example, a total of six icons which are a camera icon i1, a microphone icon i2, a speaker icon i3, a beacon icon i4, a projector icon i5, and a sensor icon i6 are registered. An ADD button 221 is selected when a new icon is to be added to the electric device list 220 displayed in the column CM11.

The user touches these icons, moves these icons to the central column CM12 by drag operation, and releases these icons. The icon is arranged at a position on a grid LT or a grid point LTc in a vicinity of a position where the icon is released. The grid LT corresponds to the duct rail 8, and the grid point LTc corresponds to an intersection of the duct rail 8. Accordingly, the electric device 30 indicated by the icon is arranged at a position on the duct rail 8 or at an intersection.

In FIG. 10, the camera icons i11 to i13 are arranged at the grid points LTc. The camera 314 represented by the camera icon i13 is shown to image an inside of the store such that a range sandwiched and indicated by dotted lines L1, L2 is an angle of view at a time of imaging the inside of the store. In addition, a plurality of (for example, 15 in FIG. 10) beacon icons i4, one speaker icon i3, one projector icon i5, and one sensor icon i6 are arranged. Depending on a shape of the duct rail 8, among the electric devices that need to be moved by changing from a certain layout to a different layout, an electric device may not be possible to be moved automatically, and may require a manual movement by the user or the like. In this case, an icon of the electric device that requires a manual movement may be displayed with a different color, size, shape, and the like from those of an icon of an electric device that does not require a manual movement.

In addition to the grid LT and the icons, the layout generation screen displayed in the central column CM12 includes, as a background image 233, an image of a space in the store as viewed from above. A plurality of product shelves 231z provided in the store are shown in the background image 233.

In the property (PROPERTY) 240 displayed on the right column CM13, identification information (DEVICE ID) 241 of the electric device 30 and a list of recipe information 242 of the electric device 30 in operation (BEHAVIOR) are shown. Below the property 240, a delete button (DELETE) 240z and an add button (ADD) 240y are displayed. When the user selects one recipe information 242 and touches the delete button 240z while the identification information 241 of the electric device 30 is displayed, this recipe information 242 is erased. When the add button 240y is touched, this recipe information 242 is added.

The live view 245 (LIVE VIEW) displays a video imaged by the electric device 30 identified by the identification information 241, here, the camera 314 represented by the camera icon i13.

The adjustment box 250 includes a plurality of operation buttons 250z configured to instruct the operation of the electric device 30 (here, the camera 314) specified by the identification information 241. The plurality of operation buttons 250z include four buttons configured to switch an imaging direction up, down, left and right, two buttons configured to rotate the imaging direction in the pan direction (counterclockwise and clockwise), and two buttons configured to tilt the imaging direction in the tilt direction. When the user touches one of these operation buttons 250z, an orientation (the imaging direction) of the camera 314 is changed. At least a part of the property 240, the live view 245, and the adjustment box 250 may be displayed in the column CM13. For example, only the property 240, only the live view 245, or only the live view 245 and the adjustment box 250 are displayed in the column CM13.

Below the layout screen GM1, a layout list button (LAYOUT LIST) 261 configured to display a list of registered layout information is displayed selectably. A target specifying button (OBJECT) 262 configured to specify an electric device 30 to be laid out is displayed selectably. A magnification slide bar 263 configured to enlarge and reduce the layout generation screen of the central column CM12 is displayed. A direction designation button 264 configured to designate a layout direction is displayed. The direction designation button 264 can switch a layout between a layout in an X-Y direction representing a horizontal space in the store and a layout in the Z direction representing a vertical space in the store. In FIG. 10, the direction designation button 264 is selected to display the layout in the X-Y direction. A save button 265 configured to register layout information representing the layout created and edited by the above-described operation in the memory 52 of the management server 50 is displayed. A storage destination in which the layout information is saved by clicking the save button 265 is not limited to the memory 52 of the management server 50, and may be the memory 42 of the control terminal 40 or a storage on the cloud.

Augmented reality (AR) may be used to change the layout. For example, the ceiling and the duct rail 8 are imaged by a camera mounted on the control terminal 40, and the electric device 30 to be operated is selected on the touchscreen 44 that displays an imaging screen, so that the user can select the electric device 30 to be operated while imaging a real space. For example, if it is desired to move the electric device 30 to be operated, by inputting a moving destination of the electric device 30 to be operated on the touchscreen 44 that displays the imaging screen, it is possible to designate the moving destination of the target electric device 30 to be operated while imaging the real space.

An example of converting a position of the moving destination input to the touchscreen 44 into a position of the real space will be described. Position information of the electric device 30 on the coordinate duct rail 8 in the real space is used as a robot coordinate system. Position information of the control terminal 40 is used as a terminal device coordinate system.

Figure 20A:
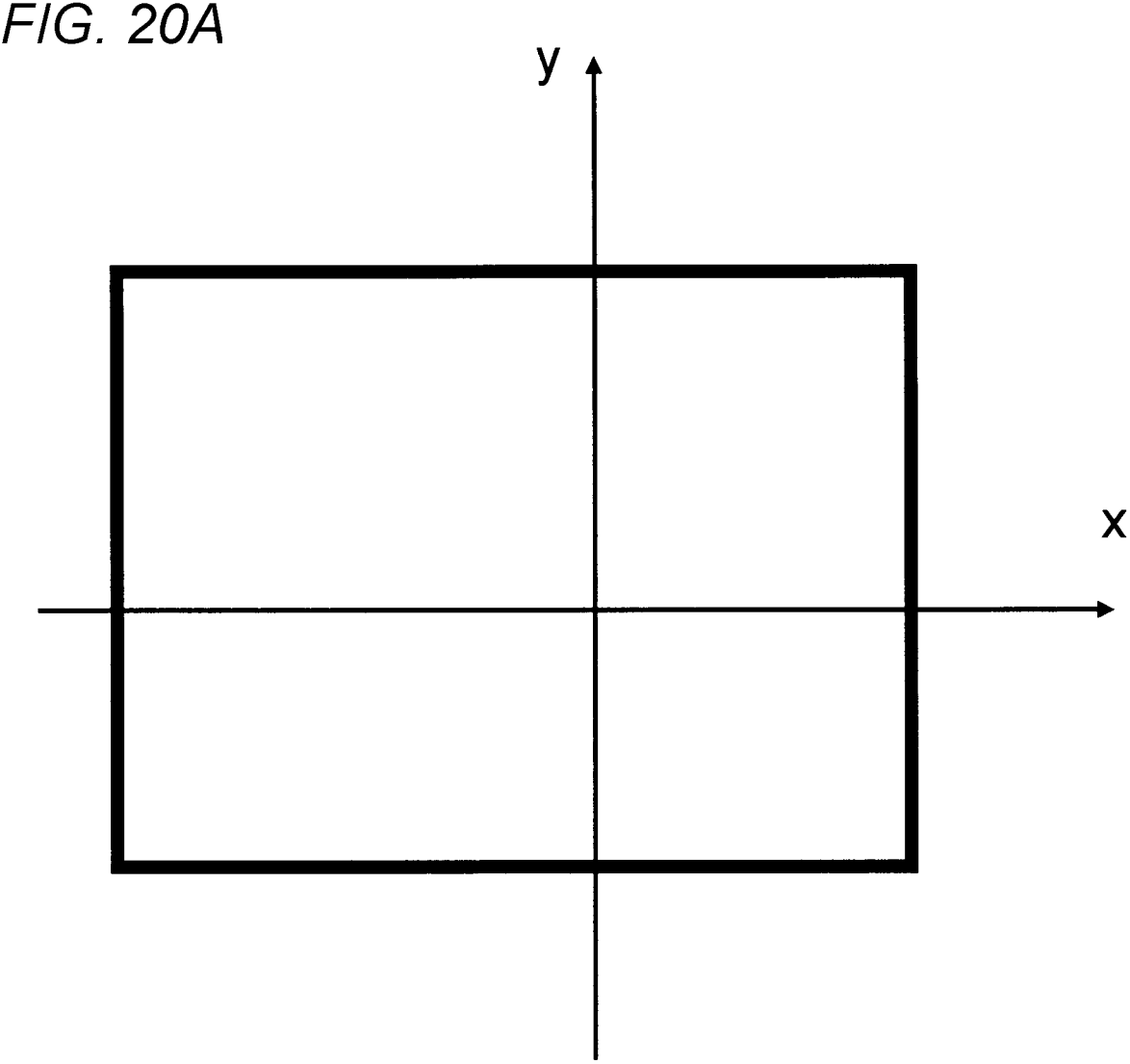
FIG. 20A shows coordinates when the duct rail is viewed from directly above in a robot coordinate system.
Figure 20B:
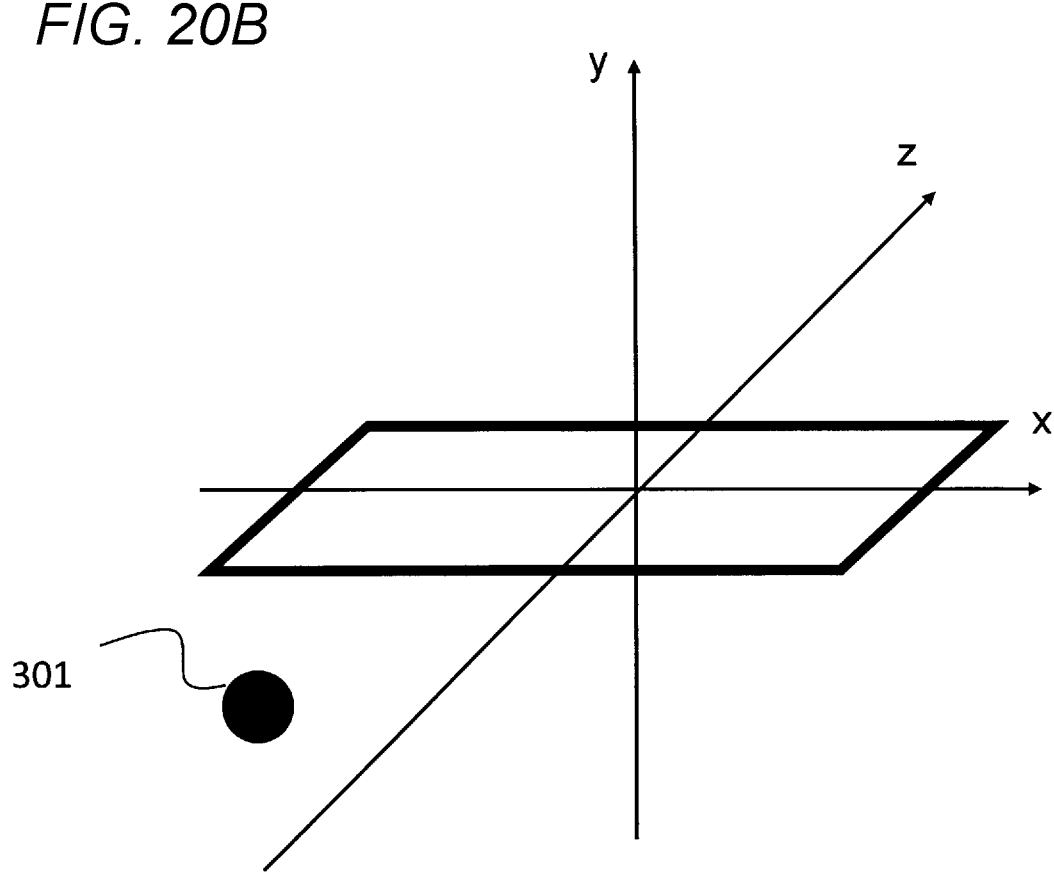
FIG. 20B shows, in a coordinate system of the control terminal, the control terminal as a rectangle and a position of the electric device as a black circle.

The control unit 51 of the management server 50 acquires the position information input on the touchscreen 44 from the control terminal 40. A coordinate conversion unit 511 converts the robot coordinate system into the terminal device coordinate system. FIG. 20A shows coordinates when the duct rail 8 is viewed from directly above in the robot coordinate system, and position information (x, y, θ) of a predetermined position of the duct rail 8 is set as (0, 0, 0). FIG. 20B shows, in a coordinate system of the control terminal 40, the control terminal 40 as a rectangle and a position 301 of the electric device 30 as a black circle.

The electric device 30 is imaged by the control terminal 40, a position of the control terminal 40 is estimated, and coordinates of the position of the control terminal 40 is set as an origin of the terminal device coordinate system. In this case, the position of the control terminal 40 is obtained by any one of the following two methods, for example.

In a method 1, an identification mark (not illustrated) attached to the electric device 30 is imaged by the camera of the control terminal 40. The control unit 51 recognizes an identification mark (not illustrated) from image information of an imaged camera image, and obtains a size and an inclination of the identification mark (not illustrated). The control unit 51 calibrates a coordinate system based on the obtained size and inclination of the identification mark (not illustrated), extracts a position of the wall by image processing of pattern matching, and calculates an imaging position of the control terminal 40 in the terminal coordinate system of the control terminal 40. This corresponds to performing coordinate conversion according to an appearance of the identification mark (not illustrated) imaged by the camera, and if the identification mark (not illustrated) is tilted, it means that the coordinate system is also tilted at a tilt angle of the identification mark.

In a method 2, a distance from the electric device 30 to the control terminal 40 is measured by a depth camera, and the position of the control terminal 40 is calculated based on the measured distance.

A known method is used to measure the distance from the electric device 30 to the control terminal 40 by the depth camera. An example of the method of measuring the distance is a time of flight (TOF) method. In the TOF method, the distance is measured based on time required for projected laser to reciprocate to a target.

The Kinect (registered trademark) of Microsoft Corporation always projects a single projection pattern (for example, a large rectangular pattern in which random dots are scattered) onto a target surface, and achieves three-dimensional measurement in all frames of a moving image imaged with an infrared camera by capturing a movement amount of each place in the pattern from the imaged image with image processing.

An image recognition technology of a camera may be used for the operation. For example, when the user is displayed by a camera mounted on the control terminal 40, a camera which is the electric device 30, or the like, and for example, when the user points to the electric device 30 to be operated, information may be transmitted from the camera to the management server 50 so that the management server 50 recognizes the electric device 30 as the electric device 30 to be operated. If the user wants to move the electric device 30 to be operated, the user who is displayed in the camera as points to a moving destination of the electric device 30 to be operated, so that the user can designate the moving destination in the real space.

The control unit 51 may display a divided screen obtained by dividing the camera image and the layout generation screen CM12 illustrated in FIG. 10 on the touchscreen 44 when the moving destination cannot be specified by an input of the user on the camera image displayed on the touchscreen 44 or based on an instruction of the user. Here, the layout generation screen CM12 includes a top view (two-dimensional map information of a facility) of a facility. As the instruction of the user, the icons may be displayed on the layout screen GM1, or the control terminal 40 may include a microphone, and the control unit 41 may recognize a voice of a predetermined word of the user to display the divided screen.

In the divided screen, it is displayed that there is an input of the user at a position of the layout generation screen CM12 corresponding to the input of the user to the camera image. In this case, the control unit 51 acquires information on the input position of the camera image on the touchscreen 44, and outputs position information of the layout generation screen CM12 corresponding to the information on the input position to the control terminal 40. Alternatively, in the divided screen, it is displayed that there is an input of the user at a position of the camera image corresponding to the input of the user to the layout generation screen CM12. In this case, the control unit 51 acquires information on the input position of the layout generation screen CM12 on the touchscreen 44, and outputs position information of the camera image corresponding to the information on the input position to the control terminal 40. That is, when the user inputs one of the camera image and the layout generation screen CM12 on the divided screen, the input of the user of the rest image is displayed.

The operation information may be instructed by the voice of the user, which is achieved by providing a voice recognition function as an input unit to the connection unit 10, the electric device 30, or the control terminal 40.

Figure 11:
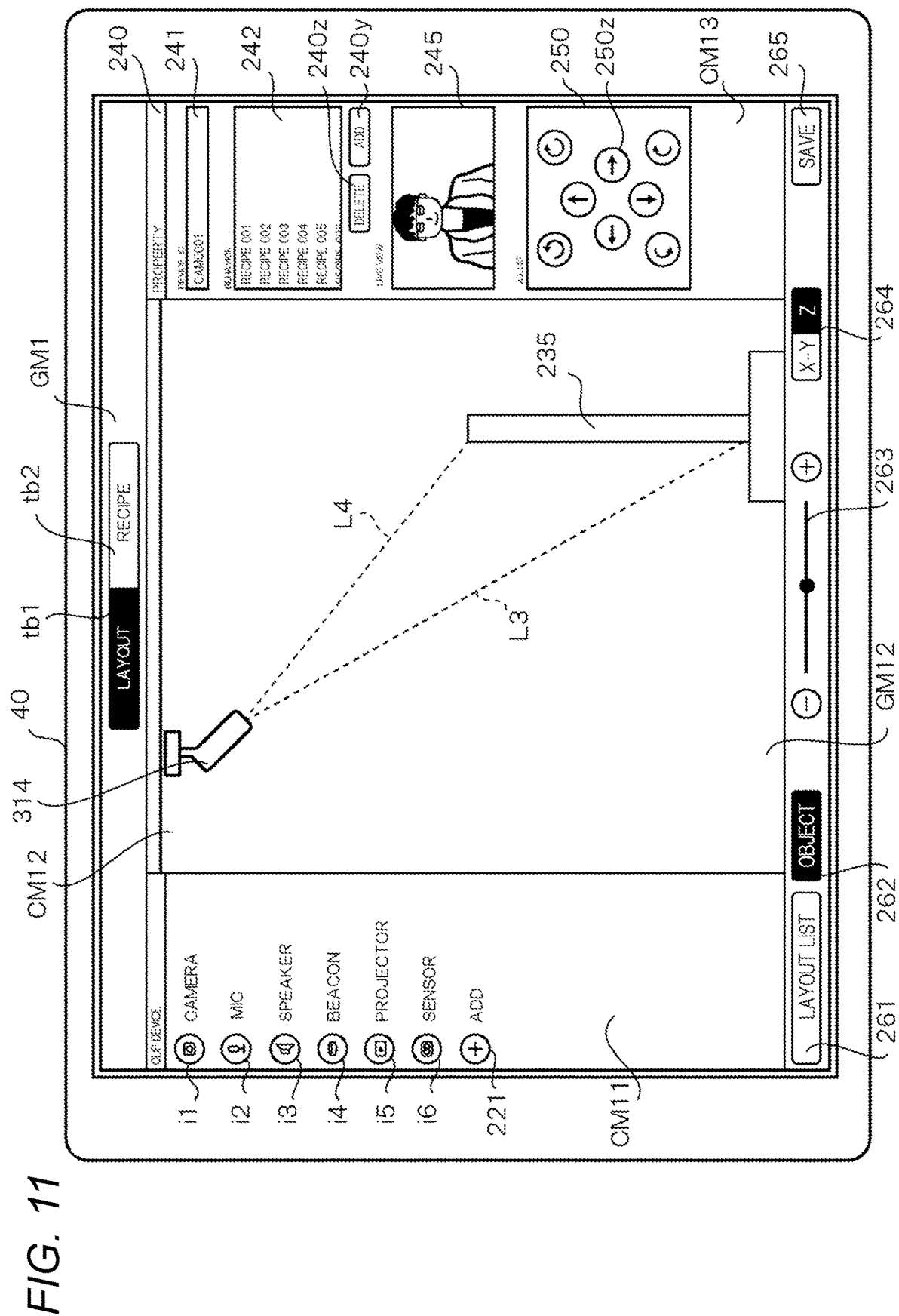
FIG. 11 illustrates an example of a screen displayed on the touchscreen of the control terminal in a case in which a direction designation button has been switched to a layout in a Z direction.

FIG. 11 illustrates an example of a screen displayed on the touchscreen 44 of the control terminal 40 in a case in which the direction designation button 264 has been switched to a layout in the Z direction. By operation of the user on the screen illustrated in FIG. 11, the control unit 41 of the control terminal 40 executes processing in response to the operation, and displays data or information on an execution result on the touchscreen 44. When the direction designation button 264 is switched to the layout in the Z direction, a vertical arrangement of the camera 314 corresponding to the camera icon i13, which is specified by the target specifying button 262 and is displayed in the identification information 241, is shown in the central column CM12. An angle of view imaged by the camera 314 is a range sandwiched and indicated by dotted lines L3, L4. Here, a signboard 235 to which a poster is attached as a subject is imaged. An imaging range of the subject to be imaged changes depending on an orientation or a direction of the camera 314. In the live view 245, a video of the subject in the imaging range that is imaged by the camera 314 is displayed. When the direction designation button 264 is switched to the layout in the Z direction, display items of the left column CM11 and the right column CM13 on the layout screen GM1 do not change.

When the position of the camera 314 is adjusted, the position and the orientation of the camera 314 may be finely adjusted by detecting a movement of a person in the real space with the sensor 317 configured to detect a movement of a person, displaying the camera 314 on the touchscreen 44 of the control terminal 40 in augmented reality (VR), and moving the position of the camera 314 with a finger.

Figure 12:
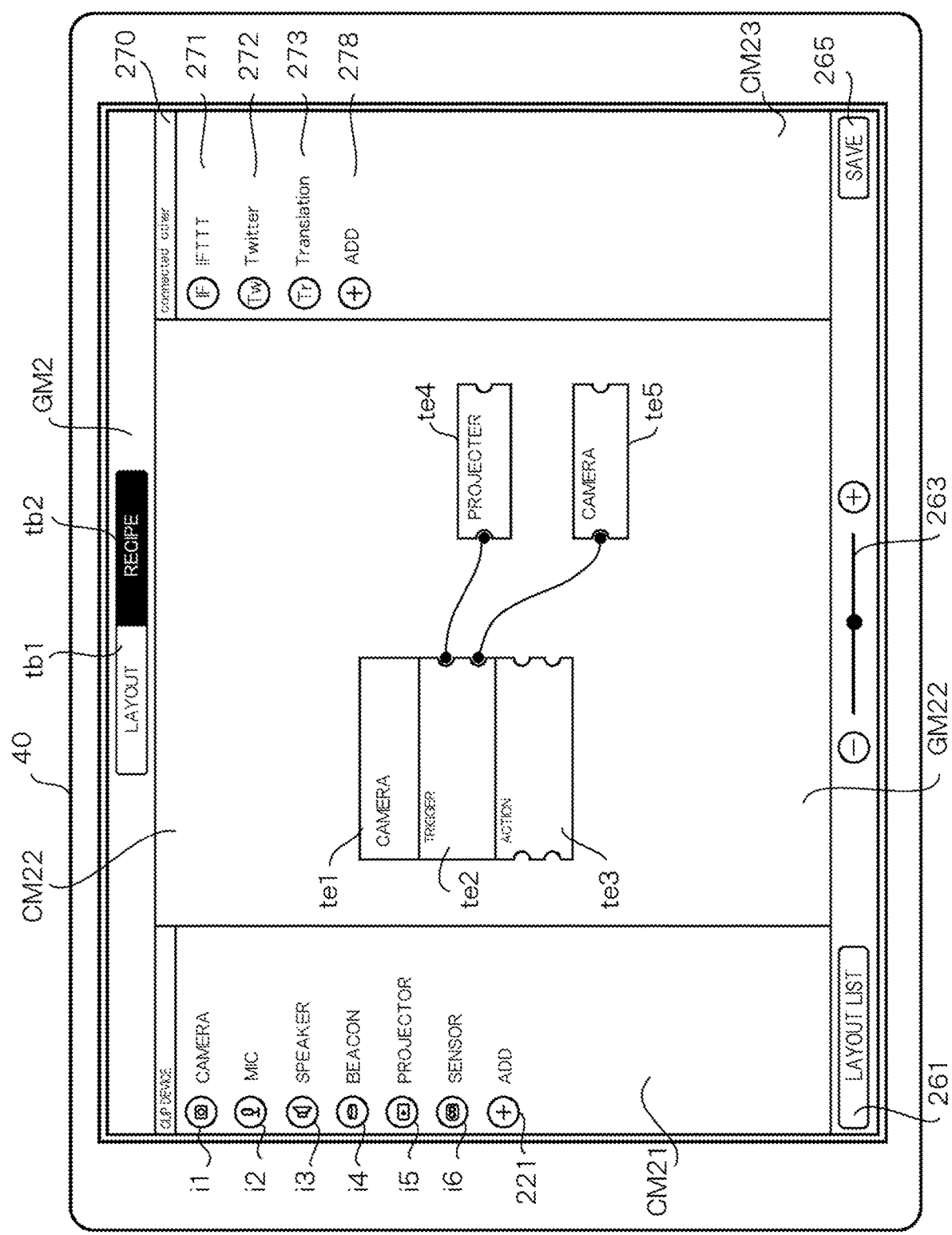
FIG. 12 illustrates an example of a screen displayed on the touchscreen of the control terminal in a case in which a tab configured to set recipe information has been selected by touch operation.

FIG. 12 illustrates an example of a screen displayed on the touchscreen 44 of the control terminal 40 in a case in which the tab tb2 configured to set recipe information has been selected by touch operation. By operation of the user on the screen illustrated in FIG. 12, the control unit 41 of the control terminal 40 executes processing in response to the operation, and displays data or information on an execution result on the touchscreen 44. When the tab tb2 is selected by the touch operation, the touchscreen 44 displays the recipe screen GM2. The recipe screen GM2 includes three columns. In the recipe screen GM2, the electric device list 220 is displayed in a left column CM21 in the drawing, similarly to that in the left column CM11 on the layout screen GM1. In a right column CM23, a list 270 of SNS/Web service 90 is displayed. Here, examples of the SNS/Web service 90 include IFTTT 271, Twitter (registered trademark) 272, and Translation 273. An ADD button 278 is selected when a new SNS/Web service is added to the list 270 of the SNS/Web service 90 displayed in the column CM23.

A recipe setting screen GM22 is displayed in the central column CM22. In the recipe setting screen GM22, it is possible to set a target for recipe setting by dragging the icons registered in the electric device list 220. That is, when the user touches one of the icons i1 to i6, moves the icon to the central column CM22 by drag operation, and releases the icon, the icon is displayed on the recipe setting screen GM22, and the electric device 30 corresponding to the icon becomes a target for recipe setting. In FIG. 12, the camera icon i1 is dragged from the electric device list 220, and a tile te1 indicating that the camera 314 is a setting target is displayed on the recipe setting screen GM22.

Below the tile te1, tiles te2, te3 representing operation conditions of the camera 314 are registered. The operation conditions can be set by the user performing a touch input on the touchscreen 44. For example, in the tile te2, a fact that the camera 314 has detected a person is registered as the operation condition. A date and time and a place are registered in the tile te2. The tile te2 is associated with a tile te4 of the projector icon i5 dragged from the electric device list 220 and a tile te5 of the camera icon it newly dragged from the electric device list 220. In the tile te3, an operation content when the operation condition registered in the tile te2 is satisfied is registered. The registered operation contents include a content that the projector 313 corresponding to the projector icon i5 projects an image on a wall surface, and a content that the camera 314 corresponding to the camera icon i1 images a predetermined place and determines an age group of the person in the imaged image.

Based on the above-described operation conditions and the above-described operation contents, for example, it is possible to set an effect that, when a person is viewed at a clothing corner during a period of time (predetermined time) of a time sale, the projector 313 is operated to display women wearing clothes of various fashions on the wall surface. It is also possible to set an effect that the camera 314 is operated to determine an age group from a plurality of face images of the person in the imaged image, and to display clothes suitable for an age of the person.

The recipe information set by the above-described operation is transmitted from the control terminal 40 to the management server 50 by pressing the save button 265, and the control unit 51 of the management server 50 registers the transmitted recipe information in the memory 52. A storage destination in which the recipe information is saved by clicking the save button 265 is not limited to the memory 52 of the management server 50, and may be the memory 42 of the control terminal 40 or a storage on the cloud. Alternatively, the recipe information may be stored in the memory 72 of the external server 70 for publication.

Figure 13:
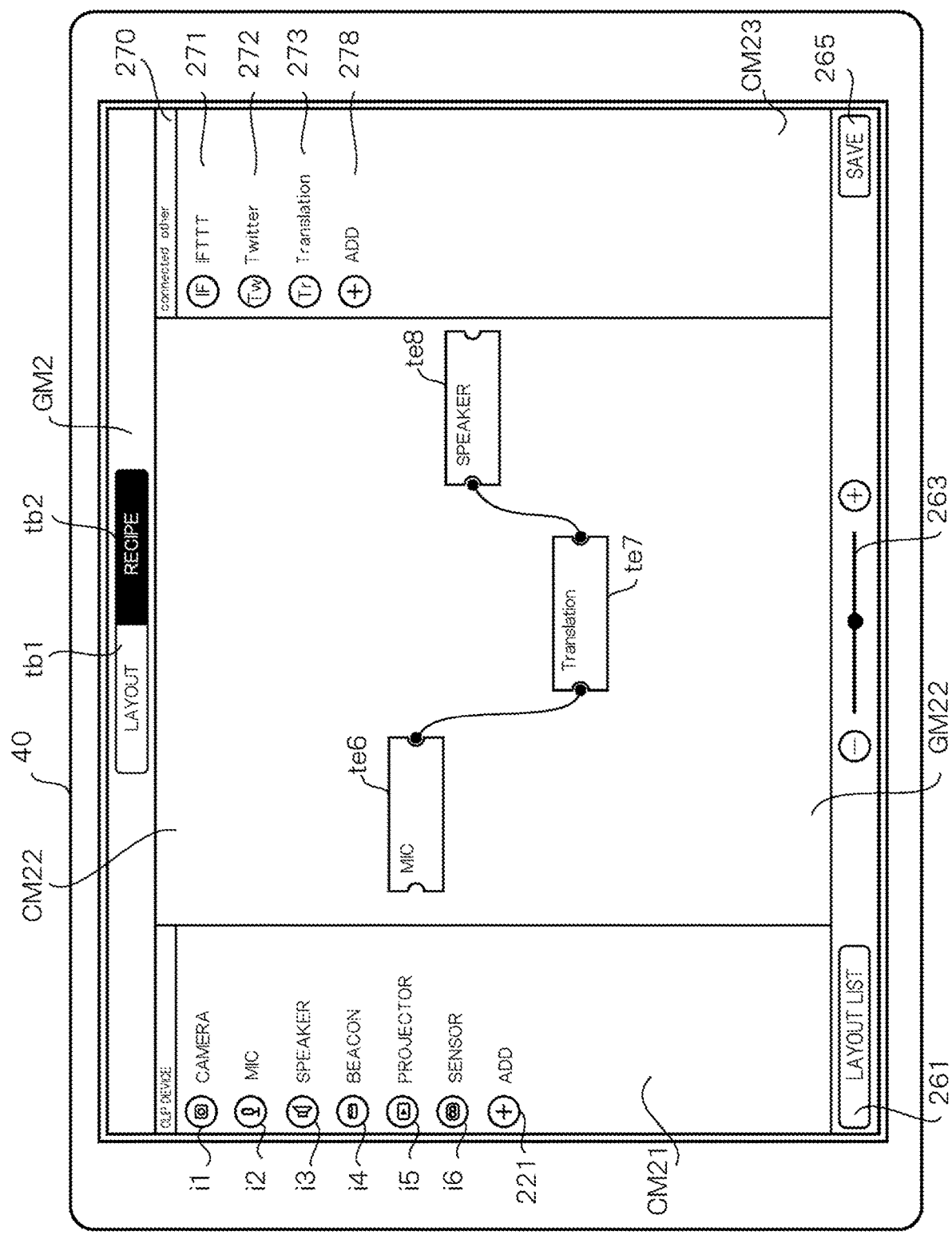
FIG. 13 illustrates an example of a screen displayed on the touchscreen of the control terminal in a case in which the recipe information is set using Translation as an SNS/Web service.

FIG. 13 illustrates an example of a screen displayed on the touchscreen 44 of the control terminal 40 in a case in which the recipe information is set using the Translation 273 as the SNS/Web service 90. By operation of the user on the screen illustrated in FIG. 13, the control unit 41 of the control terminal 40 executes processing in response to the operation, and displays data or information on an execution result on the touchscreen 44. In the recipe setting screen GM22, a tile te6 representing the microphone 315 is arranged by dragging the microphone icon i2 registered in the electric device list 220. A tile te1 representing the Translation 273 is arranged by dragging the Translation 273 registered in the list 270 of the SNS/Web service 90. A tile te8 representing the speaker 316 is arranged by dragging the speaker icon i3 registered in the electric device list 220. The recipe information is set by associating the tile te6 with the tile te1 and associating the tile te1 with the tile te8. With this setting, recipe information is set in which, when a foreign language voice is input through the microphone 315, the Translation 273, which is a Web service, converts the input voice into a Japanese voice, and the speaker 316 emits the voice in Japanese. The recipe information may include a setting for converting the Japanese voice into the foreign language voice.

Accordingly, for example, when a foreigner asks at a cash register of the store, a clerk can immediately understand contents pronounced in a foreign language in Japanese. Therefore, it is possible to improve customer service manners and to contribute to an increase in sales.

Figure 14:
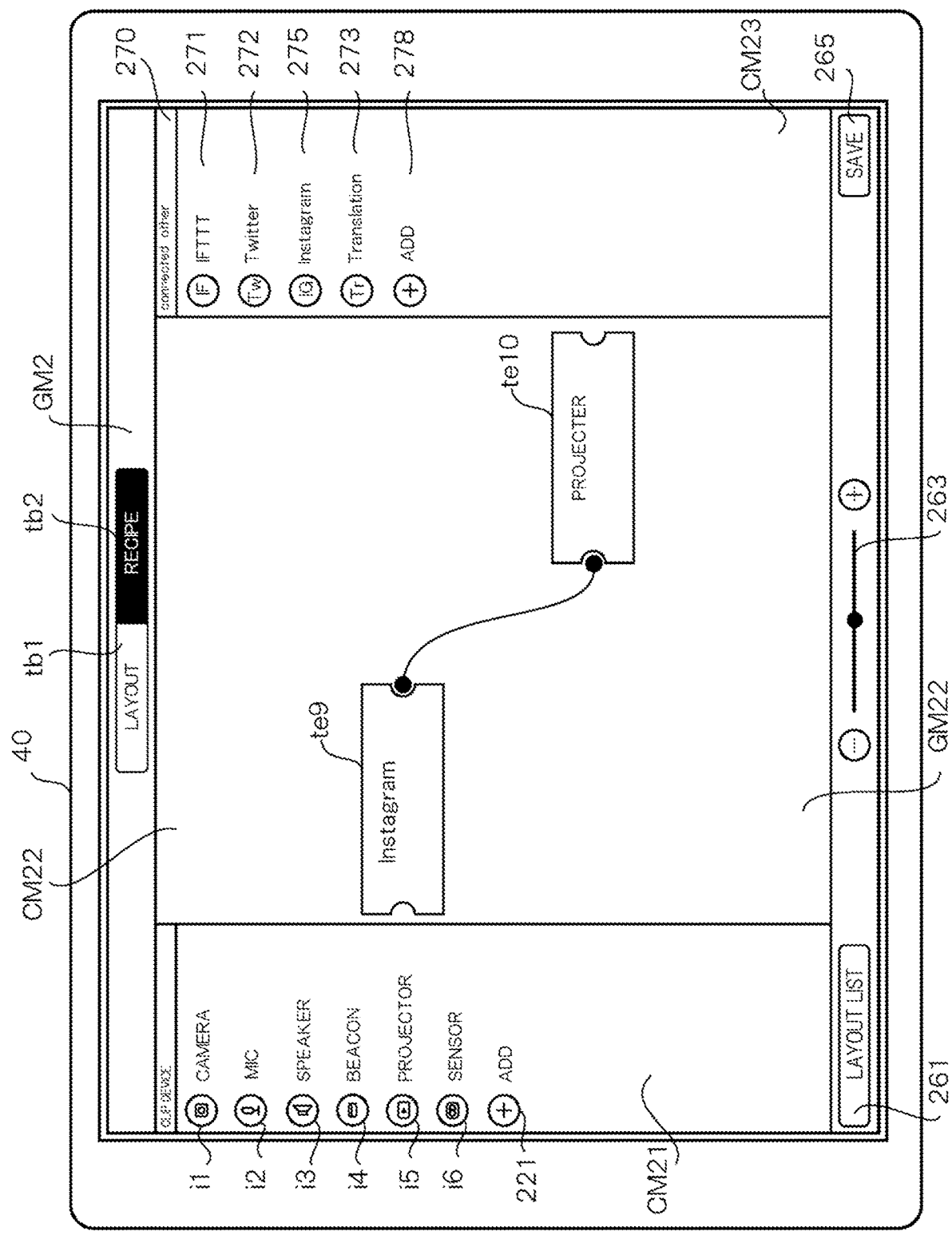
FIG. 14 illustrates an example of a screen displayed on the touchscreen of the control terminal in a case in which the recipe information is set using Instagram as the SNS/Web service.

FIG. 14 illustrates an example of a screen displayed on the touchscreen 44 of the control terminal 40 in a case in which the recipe information is set using Instagram 275 as the SNS/Web service 90. By operation of the user on the screen illustrated in FIG. 14, the control unit 41 of the control terminal 40 executes processing in response to the operation, and displays data or information on an execution result on the touchscreen 44. A tile te9 representing the Instagram 275 is arranged by dragging the Instagram 275 registered in the list 270 of the SNS/Web service 90. In the recipe setting screen GM22, a tile te10 representing the projector 313 is arranged by dragging the projector icon i5 registered in the electric device list 220. The recipe information is set by associating the tile te9 with the tile te10. With this setting, when an image is posted on the Instagram 275, for example, when the posted image is an image in the store, the projector 313 can move to this place and project a video. Accordingly, it is possible to show various videos to a person who is interested in the image.

Figure 15:
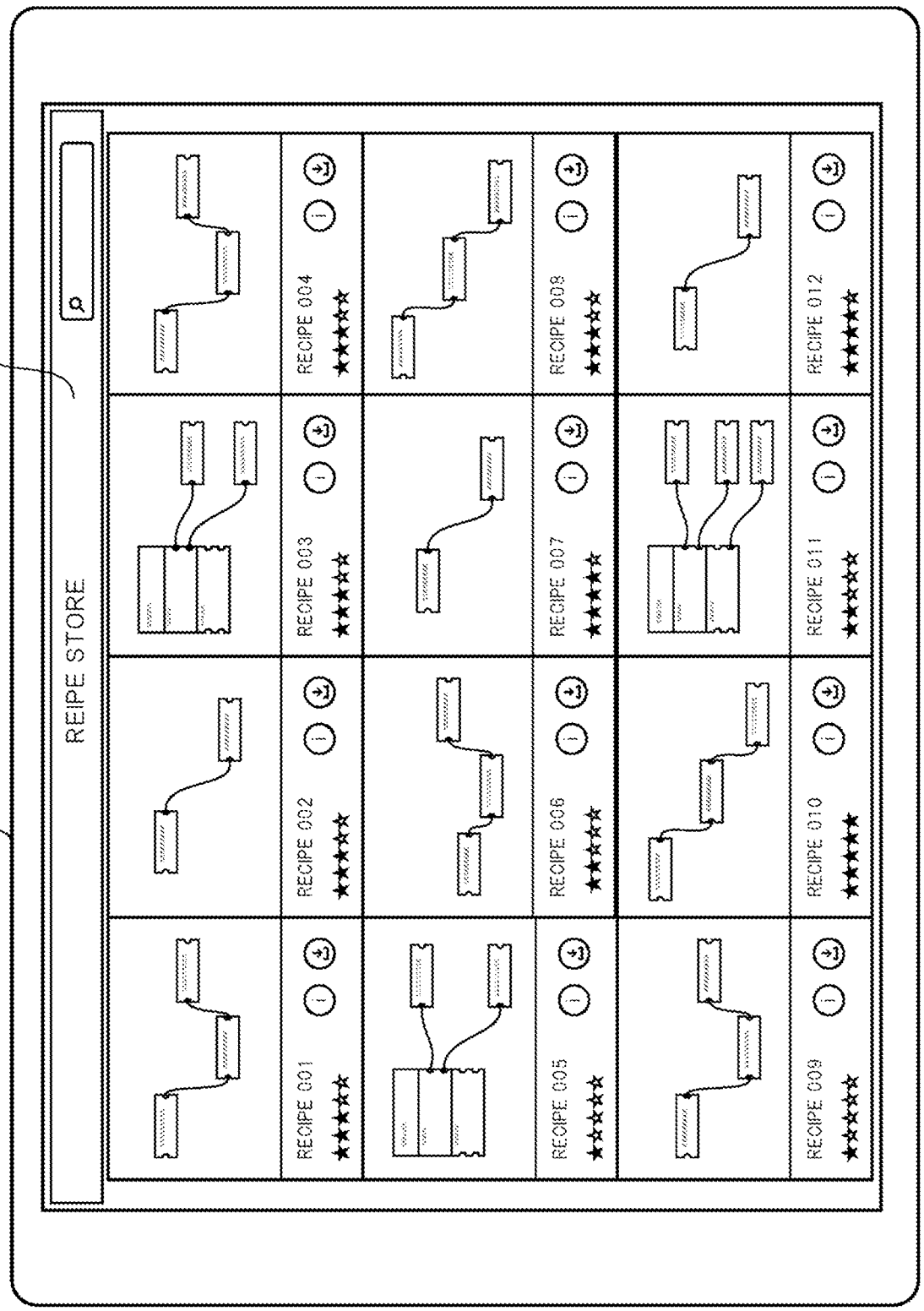
FIG. 15 illustrates a screen of the touchscreen of the control terminal on which a list of the recipe information registered in a recipe store is displayed.

Various recipe information may be registered in a recipe store on the cloud, and may be published for a fee or free of charge through a network. FIG. 15 is illustrating an example of a screen in which a list of recipe information registered in a recipe store 310 is displayed on the touchscreen 44 of the control terminal 40. As shown by recipe numbers 001 to 0012, a number of pieces of recipe information are registered in the recipe store 310. The control unit 41 of the control terminal 40 can access the recipe store 310 via the communication unit 43, download the registered recipe information, and store the registered recipe information in the memory 42. Accordingly, the user can save a trouble of setting the recipe information, and can easily set new recipe information by incorporating a part of the registered recipe information into the recipe information to be newly set.

(Operation of Device Management System)

Next, an operation procedure of the device management system 5 according to the first embodiment will be described.

Figure 16:
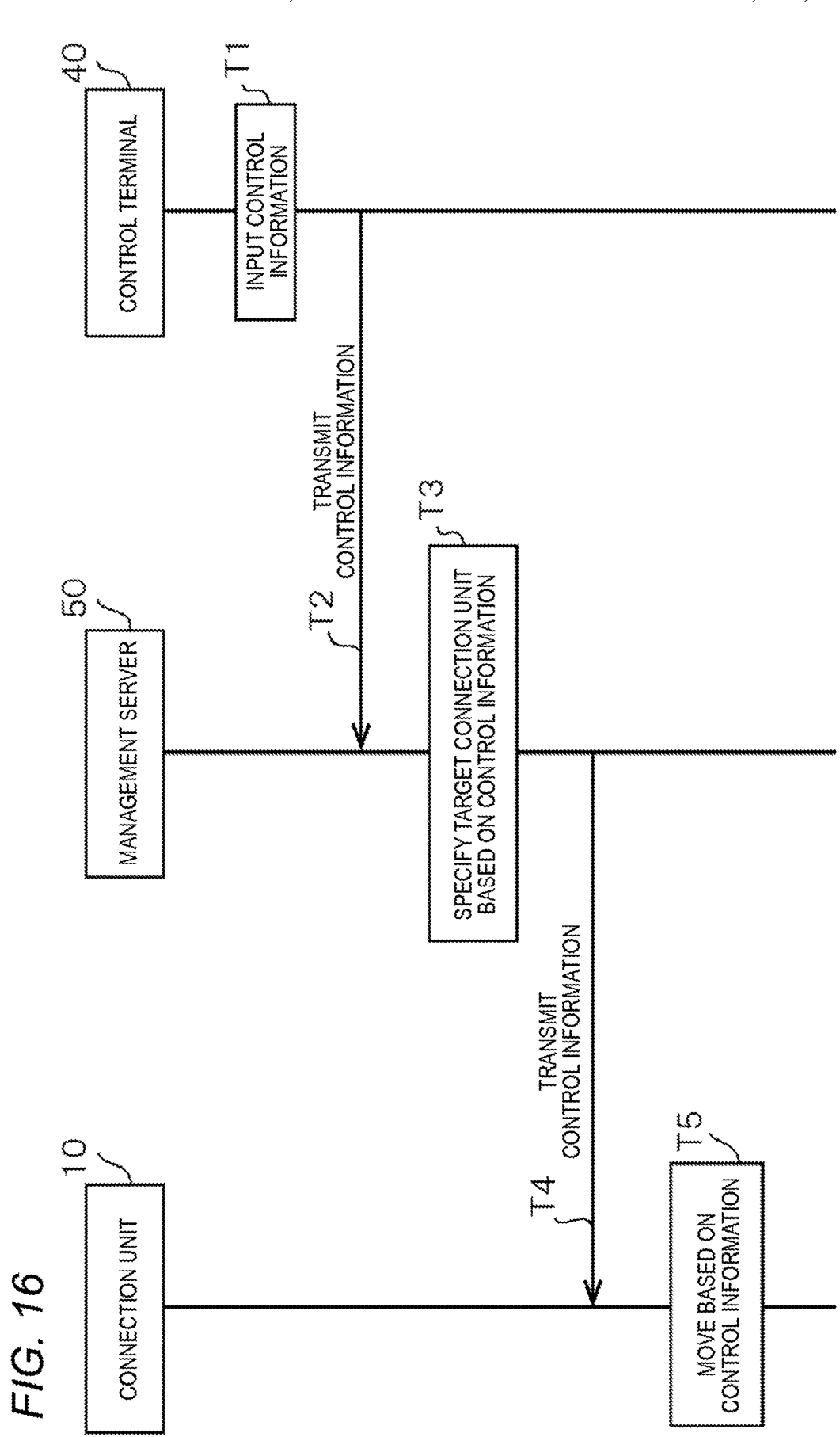
FIG. 16 is a sequence diagram showing an example of an operation procedure for directly moving the connection unit from the control terminal.

First, an operation example of moving the connection unit 10 along the duct rail 8 will be described. FIG. 16 is a sequence diagram showing an example of an operation procedure for directly moving the connection unit 10 from the control terminal 40.

In FIG. 16, the user inputs control information for moving the connection unit 10 on the touchscreen 44 (that is, a UI which is a user interface) of the control terminal 40. As described above, the control information is layout information, recipe information, electric device movement information, and the like. The electric device movement information may be included in the layout information. Examples of the control information to be input include information for moving the projector 313 provided at a fresh food corner to a vegetable corner. The control terminal 40 receives the control information input by the user (T1).

The control terminal 40 transmits the input control information to the management server 50 (T2). when receiving the control information from the control terminal 40, the management server 50 specifies the connection unit 10 to which the target electric device 30 is connected (T3). At this time, the management server 50 may add other information (for example, the identification information of the control terminal 40 to which the control information has been input) to the control information transmitted to the connection unit 10 to which the target electric device 30 is connected.

The management server 50 transmits the control information to the connection unit 10 (T4). The connection unit 10 determines the moving destination and moves based on the control information received from the management server 50 (T5).

Figure 17:
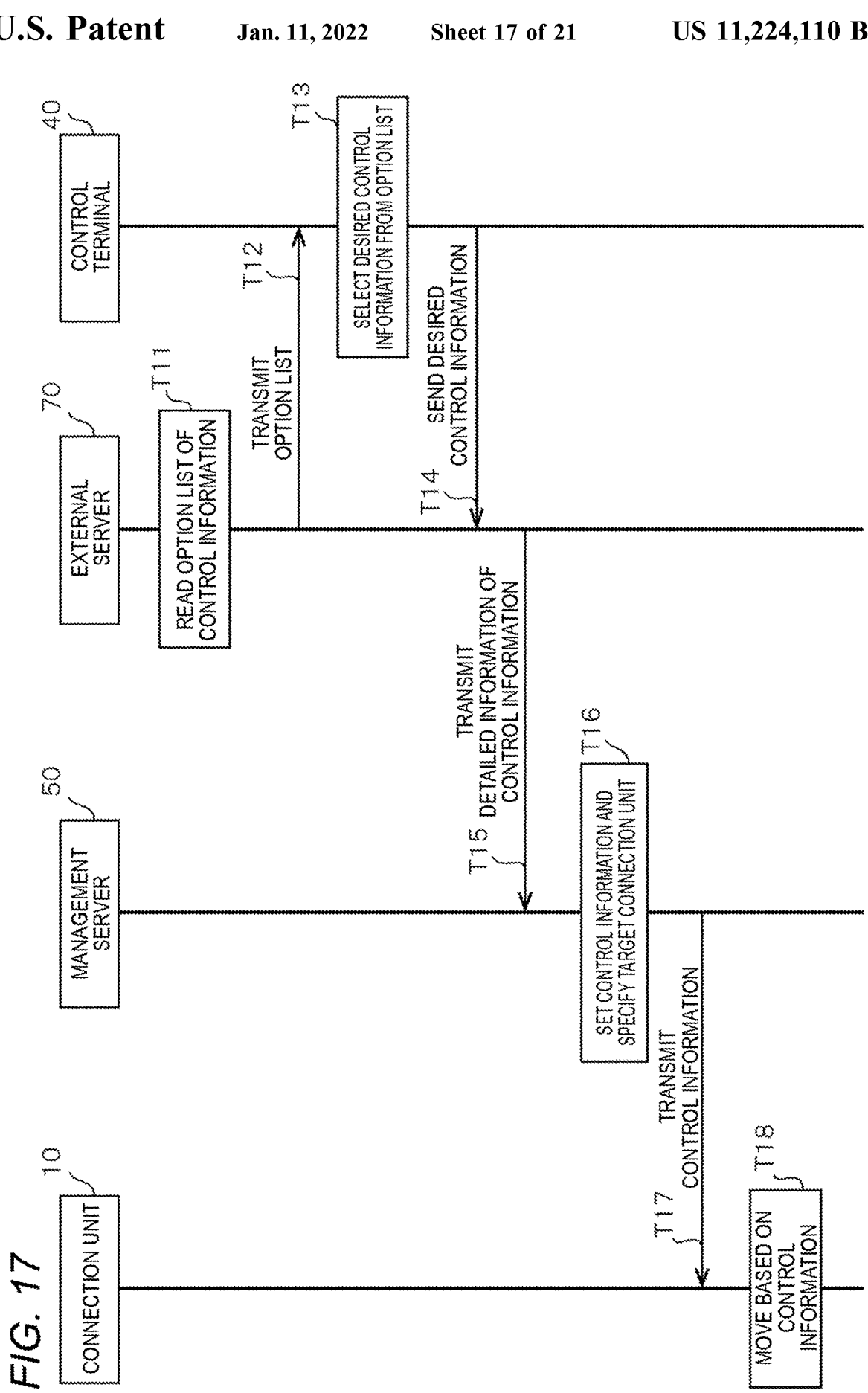
FIG. 17 is a sequence diagram showing an example of an operation procedure for moving the connection unit using control information of an external server.

FIG. 17 is a sequence diagram showing an example of an operation procedure for moving the connection unit 10 using control information of the external server 70.

In FIG. 17, the external server 70 registers control information which is layout information, recipe information, or the like as an option list. The external server 70 reads the option list of the control information (T11). The external server 70 transmits the read option list to the control terminal 40 (T12). A timing of transmitting the option list may be regular or a timing when the transmission is requested by the control terminal 40.

The control terminal 40 receives the option list from the external server 70, and receives desired control information selected by input operation of the user from the option list (T13). The control terminal 40 notifies the external server 70 of the desired control information (T14). Communication between the control terminal 40 and the external server 70 may be performed via the management server 50 or may be performed directly.

The external server 70 transmits detailed information of the selected control information to the management server 50 (T15). The management server 50 sets current control information based on the received detailed information of the control information (T16). The management server 50 transmits the set control information to the connection unit 10 to which the target electric device 30 is connected (T17). The connection unit 10 specifies the moving destination and moves based on the control information received from the management server 50 (T18). Here, the external server 70 has transmitted the detailed information of the control information to the management server 50. However, the control terminal 40 may receive the detailed information of the control information from the external server 70 and directly transmit the detailed information of the control information to the management server 50.

For example, the option list may include spatial information in addition to the control information. The external server 70 may acquire the control information according to the spatial information (a size of a space, a shape of the space, and a use of the space) of a facility where the device management system 5 is provided (T11). An example of the size of the space is a length of a three-dimensional space (x, y, z) and a two-dimensional space (x, y). Here, z means a height. An example of the shape of the space is a shape of the two-dimensional space and a shape of the three-dimensional space.

The option list may include information on a position of the user in the facility in addition to the control information. The position of the user may be a two-dimensional position excluding height information or a three-dimensional position. When displaying the option list, the control terminal 40 displays information on the position of the user. For example, when the electric device 30 is the speaker 316, a position (an optimal position) at which a sound of the speaker 316 is likely to be heard is determined based on directivity of the speaker 316 and a position of the speaker 316. At this time, the control information of the option list includes information for controlling the electric device 30 so that the sound of the speaker 316 is likely to be heard at the optimum position. For example, information of the optimum position can be created by mapping a region where a function of the electric device 30 operates and a strength of the operation in the space of the facility. In a case in which the electric device 30 is a spotlight, the region where the function of the electric device 30 operates indicates a range illuminated by the spotlight, and the strength of the operation of the function of the electric device 30 indicates brightness of the region illuminated by the spotlight. An example of the brightness is illuminance (lux). For example, when the device management system 5 includes a plurality of speakers 316, it is possible to obtain the position (the optimum position) where the sound of the speaker 316 is likely to be heard based on the directivity information and information of a sound attenuation degree for each volume level. Accordingly, the user can check the display of the control terminal 40 and select the desired control information based on the position of the user who wants to hear the sound of the speaker 316. The control terminal 40 receives the control information selected by the input operation of the user that corresponds to the position of the user who wants to hear the sound of the speaker 316 (T13). Here, the position of the user does not mean the position of the user detected by the position detection sensor 18, but means the position of the user where the function of the electric device 30 operates most effectively. The position of the user may mean a region instead of one point.

Figure 18:
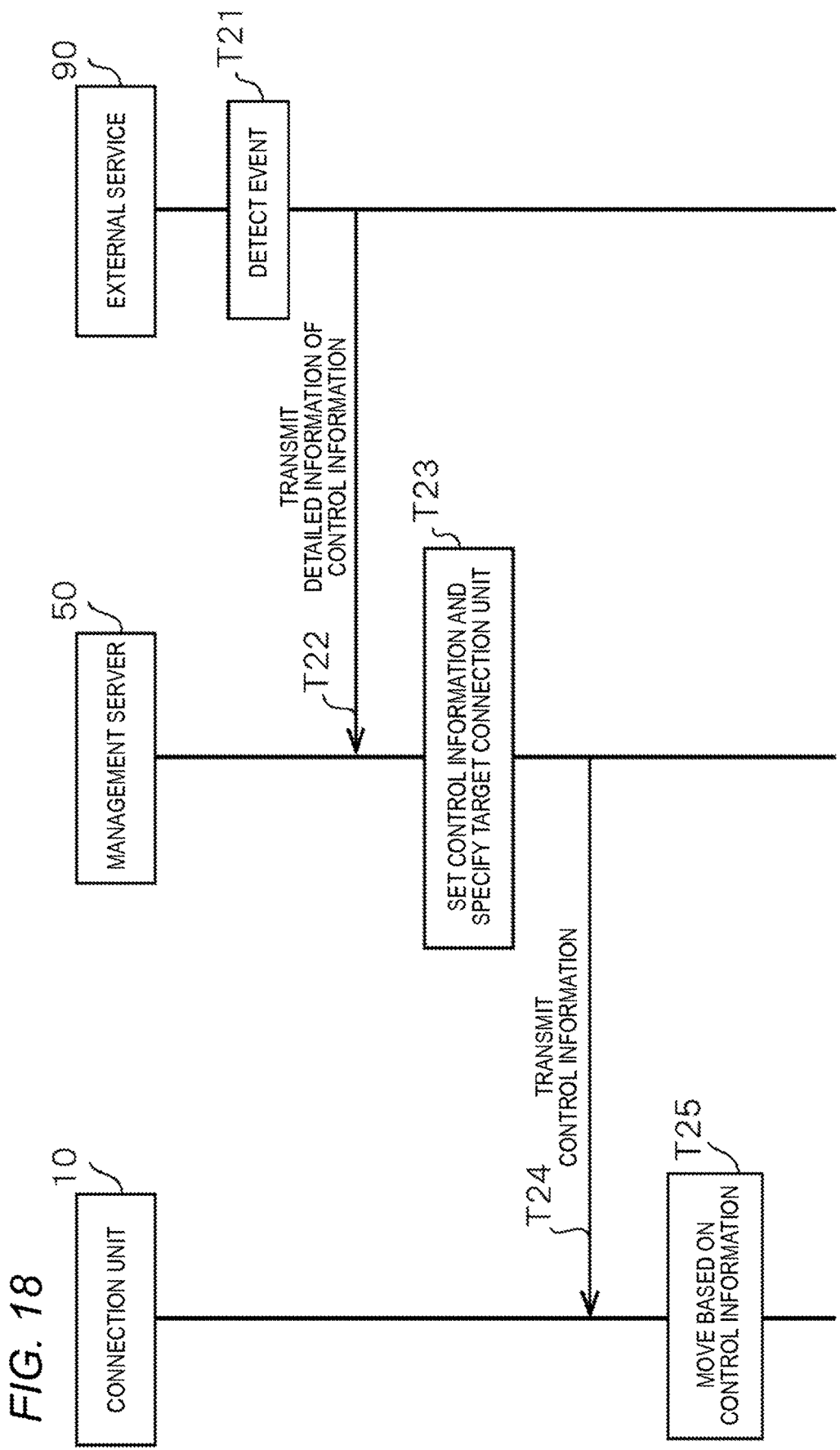
FIG. 18 is a sequence diagram showing an example of an operation procedure for moving the connection unit using the SNS/Web service.

FIG. 18 is a sequence diagram showing an example of an operation procedure for moving the connection unit 10 using the SNS/Web service 90.

In FIG. 18, the SNS/Web service 90 detects a regular date and time and an event (T21). As an event detected by the SNS/Web service 90, for example, a specific photo is posted on Instagram (registered trademark), a message including a specific word is uploaded on Twitter (registered trademark), and the like. The SNS/Web service 90 transmits the detailed information of the control information to the management server 50 at a regular date and time or when the event is detected (T22). The control information includes the above-described layout information and recipe information. The management server 50 may request the detailed information from the SNS/Web service 90, and the SNS/Web service 90 may transmit the detailed information in response to the request.

The management server 50 sets the current control information based on the received detailed information of the control information, and specifies the target connection unit 10 (T23). The management server 50 transmits the set control information to the connection unit 10 to which the target electric device 30 is connected (T24). The connection unit 10 specifies the moving destination and moves based on the control information received from the management server 50 (T25).

Figure 19:
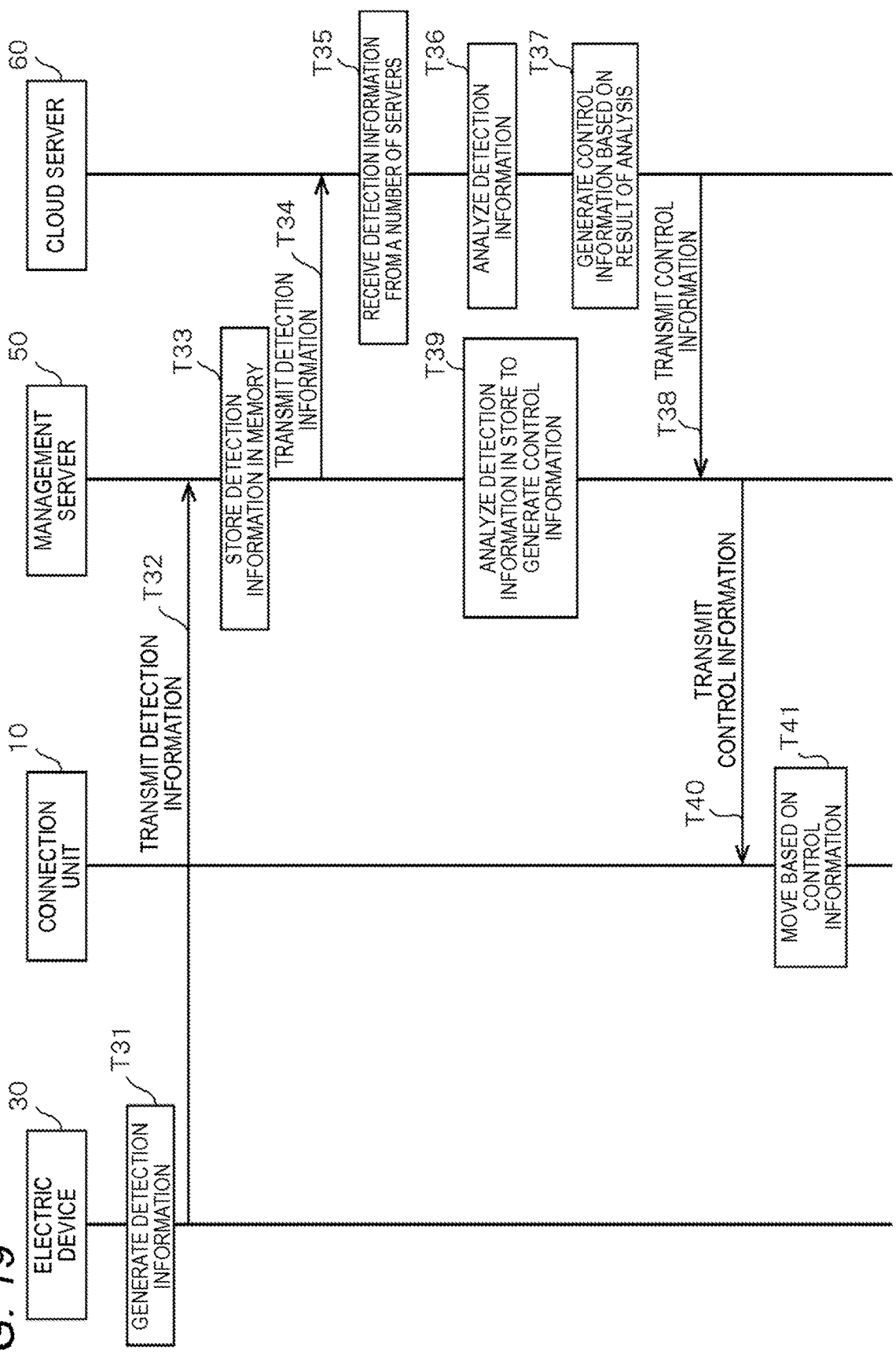
FIG. 19 is a sequence diagram showing an example of an operation procedure for moving the connection unit using detection information of the electric device.

FIG. 19 is a sequence diagram showing an example of an operation procedure for moving the connection unit 10 using detection information of the electric device 30.

In FIG. 19, the electric device 30 generates detection information (T31). For example, when the electric device 30 is the fan 319, the detection information may be a room temperature detected by a temperature sensor so that the fan 319 operates when the temperature sensor detects an increase in room temperature. When the electric device 30 is the camera 314, the detection information may include the age of the person in the image imaged by the camera 314. The electric device 30 transmits the generated detection information to the management server 50 (T32).

When receiving the detection information, the management server 50 stores the detection information in the memory 52 (T33). The management server 50 transmits the detection information to the cloud server 60 to have the detection information analyzed (T34).

The cloud server 60 receives the detection information from a number of servers including the management server 50 (T35), and analyzes the detection information (T36). As this analysis, for example, a place where many people gather may be searched based on an image imaged by the camera 314. As a result of the analysis, in supermarkets which are an A store, a B store, a C store, and the like, information is obtained in which a large number of people gather in a fruit corner from approximately 5:00 in the evening.

The cloud server 60 generates control information based on the result of the analysis (T37). The control information generated by the cloud server 60 includes recipe information that leads to promotion of sales such as, at approximately 5:00 in the evening, moving and lighting the spotlight to illuminate the fruit corner, and moving the projector to the fruit corner to project a video. The cloud server 60 transmits the generated control information to the management server 50 (T38). The electric device may be moved and controlled according to not only the analysis related to time information but also an analysis result related to weather information, a day of a week, a congestion level in the store, and the like.

The management server 50 also analyzes the detection information in the store received from the electric device 30 to generate control information in the management server 50 (T39). As this analysis, for example, based on the image imaged by the camera 314, information is obtained in which young female customers gather in the clothing corner. As a result of this analysis, the management server 50 generates control information including recipe information for moving the speaker to the clothing corner to play music for young people. In other words, based on an analysis result of information of a user group at a predetermined place in the facility, control information including the function of the electric device 30 corresponding to the user group is generated. A position (a place) where a predetermined target user group gathers may be acquired as an analysis result, and control information including the function of the electric device 30 corresponding to the target user group may be generated. In other words, the control information may include information for controlling the electrical device 30 only with detection information corresponding to the predetermined target user group. The target user group is included in a target attribute. A plurality of target user groups may be set in advance, and different places may be set for each target user group. The target user group may be changed according to a period of time. That is, a condition of the detection information may be different depending on the period of time. For example, the target user group may be set to a family group (users with children) in a period of daytime (time included in a period of time from 10:00 to 17:00), and the target user group may be set to a female group in their twenties to thirties in a period of nighttime (time included in a period of time from 17:00 to 24:00). In this case, the management server 50 acquires information of the target user group and analyzes the information based on the detection information.

The management server 50 selects the control information generated by the management server 50 and the control information generated by the cloud server 60, and transmits the selected control information to the connection unit 10 to which the target electric device 30 is connected (T40). Which is set to control information with a higher priority can be set freely. The connection unit 10 specifies the moving destination and moves based on the control information received from the management server 50 (T41).

In the example shown in FIG. 17, the option list may include a condition of the detection information or a condition of the analysis result in addition to the control information. When the detection information satisfies the condition of the detection information or the condition of the analysis result included in the desired control information selected by the user, the electric device 30 is controlled based on the control information. In other words, when having received the detection information satisfying the condition of the detection information, the management server 50 transmits the control information to the connection unit 10 to which the target electric device 30 is connected (T40). Here, examples of the conditions of the detection information include a position of the user, a period of time, a day of a week, a season, weather information outside the facility, and change in the weather information outside the facility. Examples of the conditions of the analysis information include attributes (gender, a height, clothes, and the like) of the user, the number of users in the facility, and the like. The connection unit 10 specifies the moving destination and moves based on the control information received from the management server 50 (T41).

For example, when the electric device 30 is a plurality of sensors 317 and a user is detected at a preset position in the facility, control information for detecting the preset position in the facility from a plurality of angles may be registered in the option list. The set position may mean a region instead of one point. An example of the set position in the facility is a place that needs to be monitored in consideration of crime prevention, a place where attention of the user is desired, or a place where a reaction of the user is desired to be acquired. By effectively utilizing the plurality of electric devices 30 and performing detection from a plurality of angles when possible, an amount of information of the user to be acquired can be increased. For example, when the electric devices 30 are a plurality of sensors or a plurality of cameras 314 and the condition of the detection information includes a plurality of set positions, the control information is created so that the plurality of cameras 314 can be dispersed to perform detection at the set position where the user is detected. For example, the control information includes information on the moving destination of the electric device 30 based on whether a user is present at other set positions of the plurality of set positions. A case will be described in which the device management system 5 includes three electric devices 30 and the detection condition have three set positions. The control information includes, for each of the three set positions, information that the three electric devices 30 function at one set position when the user is not detected in rest two setting positions, information that the two electric devices 30 function at one set position when the user is detected at another setting position, and information that one electric device 30 functions at one set position when users are detected at all of the three set positions.

As described above, in the device management system 5 according to the first embodiment, the connection unit 10 (an example of a movable connection device) includes the device connection portion 16 (an example of a connection portion) connectable to the electric device 30, and the movable connection portion 15 (an example of a driving unit) configured to move the electric device 30 along the duct rail 8 provided on the ceiling 100 of the store (an example of a facility), and can be attached to the duct rail 8. The management server 50 (an example of an information processing device) includes the control unit 51 (an example of a management unit) configured to instruct a movement of the connection unit 10 along the duct rail 8.

Accordingly, according to the device management system 5, it is possible to control the electric device to be freely movable along the duct rail provided on the ceiling of the store, and to improve convenience for the user.

Although various embodiments have been described above with reference to the accompanying drawings, the present disclosure is not limited to these embodiments. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present disclosure. Each element in the above-described embodiments may be combined freely within a range not departing from the spirit of the invention.

Although the duct rail is provided in a grid shape on the ceiling of the store, the duct rail may be provided in any shape. For example, the duct rail provided on a surface of the ceiling may be provided in a spiral shape that does not intersect, or a plurality of curved shapes that intersect at any point. The duct rail may be provided so as to be laid inside a polygonal shape, a rounded polygonal shape, an elliptical shape including a circular shape, a rugged outer shape, or the like. The duct rail may also be provided in an endless loop that does not become dead in various shapes.

The present disclosure is useful as a device management system and a device management method for controlling at least one electric device to be freely movable along a duct rail provided on a ceiling of a facility and improving convenience for a user.

The invention claimed is:

1. A device management system comprising:
a movable connection device comprising a connection portion connectable to at least one electric device, a driving unit configured to move the electric device along a duct rail provided in a facility, and a position detection sensor, the movable connection device being attachable to the duct rail; and
an information processing device comprising a management unit configured to output control information indicating an instruction of moving the movable connection device along the duct rail,
wherein the control information comprises a condition of detection information detected by the position detection sensor,
wherein in a case in which the detection information detected by the position detection sensor satisfies the condition, the management unit outputs the control information corresponding to the condition of detection information,
wherein the management unit acquires information on an input position by a user to a control terminal comprising a touchscreen configured to display a camera image of a predetermined space where the movable connection device is provided, wherein the management unit outputs control information indicating an instruction of moving the movable connection device to a position of the space corresponding to the input position by the user to the camera image, wherein the touchscreen displays a divided screen comprising a camera image of a predetermined space in which the movable connection device is provided and a map image of the space, wherein in response to detection of a first input position by the user in the camera image on the touchscreen, the management unit outputs position information corresponding to the first input position in the map image of the space to the control terminal, and wherein in response to detection of a second input position by the user in the map image of the space on the touchscreen, the management unit outputs position information corresponding to the second input position in the camera image to the control terminal.

2. The device management system according to claim 1, wherein the movable connection device is provided in the facility in which the duct rail is provided, wherein the condition of detection information comprises a condition in which a user is present at a predetermined space of the facility and in a predetermined period of time, and wherein the control information comprises information related to the predetermined space and the predetermined period of time.

3. The device management system according to claim 1, wherein the condition of detection information comprises a condition in which a predetermined attribute of a user is present, and wherein the control information comprises information related to the predetermined attribute of the user.

4. The device management system according to claim 3, wherein the attribute of a user is defined by an age group and gender of a user.

5. The device management system according to claim 1, wherein the at least one electric device comprises a first electric device, a second electric device, and a third electric device, wherein a plurality of positions comprising a first position, a second position, and a third position are set to the condition of detection information, and wherein the management unit is configured to
(a) output control information corresponding to the first position, the control information causes the first electric device, the second electric device, and the third electric device to function at the first position in response to detection of a user at the first position,
(b) output control information corresponding to the first position and the second position, the control information causes the first electric device, the second electric device, and the third electric device to function at the first position and the second position in response to detection of users at the first position and the second position, and
(c) output control information corresponding to the first position, the second position and the third position, the control information causes the first electric device, the second electric device, and the third electric device to function at the first position, the second position, and the third position in response to detection of users at the first position, the second position, and the third position.

6. The device management system according to claim 5, wherein the movable connection device is provided in the facility in which the duct rail is provided, wherein the first position, the second position and the third position correspond to a predetermined space of the facility in which the movable connection device is provided, and wherein the control information comprises information corresponding to the predetermined space.

7. A device management method for a device management system, the device management system comprising a movable connection device attachable to a duct rail provided in a facility and an information processing device comprising a management unit, the device management method comprising:

connecting at least one electric device;

outputting, by the management unit, control information indicating an instruction of moving the movable connection device along the duct rail; and moving the electric device along the duct rail via the movable connection device based on the control information, wherein the control information comprises a condition of detection information detected by a position detection sensor, wherein in a case in which the detection information detected by the position detection sensor satisfies the condition, the management unit outputs the control information corresponding to the condition of detection information, wherein the management unit acquires information on an input position by a user to a control terminal comprising a touchscreen configured to display a camera image of a predetermined space where the movable connection device is provided, and wherein the management unit outputs control information indicating an instruction of moving the movable connection device to a position of the space corresponding to the input position of the user to the camera image, wherein the touchscreen displays a divided screen comprising a camera image of a predetermined space in which the movable connection device is provided and a map image of the space, wherein in response to detection of a first input position by the user in the camera image on the touchscreen, the management unit outputs position information corresponding to the first input position in the map image of the space to the control terminal, and wherein in response to detection of a second input position by the user in the map image of the space on the touchscreen, the management unit outputs position information corresponding to the second input position in the camera image to the control terminal.

8. The device management method according to claim 7, wherein the movable connection device is provided in the facility in which the duct rail is provided, wherein the condition of detection information comprises a condition in which a user is present at a predetermined space of the facility and in a predetermined period of time, and wherein the control information comprises information related to the predetermined space and the predetermined period of time.

9. The device management method according to claim 7,
wherein the condition of detection information comprises
   a condition in which a predetermined attribute of a user
   is present, and
wherein the control information comprises information
   related to the predetermined attribute of the user.

10. The device management method according to claim 9, wherein the attribute of a user is defined by an age group and gender of a user.

11. The device management method according to claim 7,
wherein the at least one electric device comprises a first
   electric device, a second electric device, and a third
   electric device,
wherein a plurality of positions comprising a first position, a second position, and a third position are set to the condition of detection information, and
wherein the management unit is configured to
   (a) output control information corresponding to the first position, the control information causes the first electric device, the second electric device, and the third electric device to function at the first position in response to detection of a user at the first position,
   (b) output control information corresponding to the first position and the second position, the control information causes the first electric device, the second electric device, and the third electric device to function at the first position and the second position in response to detection of users at the first position and the second position, and
   (c) output control information corresponding to the first position, the second position and the third position, the control information causes the first electric device, the second electric device, and the third electric device to function at the first position, the second position, and the third position in response to detection of users at the first position, the second position, and the third position.

12. The device management method according to claim 11,
wherein the movable connection device is provided in the facility in which the duct rail is provided,
wherein the first position, the second position and the third position correspond to a predetermined space of the facility in which the movable connection device is provided, and
wherein the control information comprises information corresponding to the predetermined space.

* * * * *